US011364633B2

(12) United States Patent
Lin et al.

(10) Patent No.: US 11,364,633 B2
(45) Date of Patent: Jun. 21, 2022

(54) CLEANING ROBOT

(71) Applicant: PANASONIC INTELLECTUAL PROPERTY MANAGEMENT CO., LTD., Osaka (JP)

(72) Inventors: Jie Lin, Osaka (JP); Teruto Hirota, Tokyo (JP); Takayuki Nagata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 116 days.

(21) Appl. No.: 16/800,601

(22) Filed: Feb. 25, 2020

(65) Prior Publication Data
US 2020/0276711 A1 Sep. 3, 2020

(30) Foreign Application Priority Data

Feb. 28, 2019 (JP) .............................. JP2019-036419

(51) Int. Cl.
*B25J 19/04* (2006.01)
*B25J 9/16* (2006.01)
*B25J 11/00* (2006.01)
*B25J 9/02* (2006.01)
(Continued)

(52) U.S. Cl.
CPC ............... *B25J 9/1679* (2013.01); *B25J 9/02* (2013.01); *B25J 11/0085* (2013.01); *B25J 13/08* (2013.01); *B25J 19/04* (2013.01); *B25J 5/007* (2013.01)

(58) Field of Classification Search
CPC ........ B25J 11/0085; B25J 13/08; B25J 5/007; B25J 18/02; B25J 9/1664; B25J 13/085;
(Continued)

(56) References Cited

U.S. PATENT DOCUMENTS 10,941,553 B2 * 3/2021 D'Souza ................ B25J 13/081
10,941,555 B2 * 3/2021 D'Souza ............. B25J 11/0085
(Continued)

FOREIGN PATENT DOCUMENTS

CN 102513256 6/2012
CN 105195356 12/2015
(Continued)

OTHER PUBLICATIONS

Matsumaru et al., Windshield cleaning robot system: WSC, 1994, IEEE, pg. (Year: 1994).*
(Continued)

*Primary Examiner* — McDieunel Marc
(74) *Attorney, Agent, or Firm* — Greenblum & Bernstein, P.L.C.

(57) ABSTRACT

A cleaning robot includes an arm including a distal end portion to which a brush is attached, the arm extending in a first direction parallel to a horizontal direction, a driver connected to the arm, the driver including a first mechanism that moves the arm in the first direction, a second mechanism that moves the arm in a second direction parallel to a vertical direction perpendicular to the first direction, and a third mechanism that moves the arm in a third direction perpendicular to both the first direction and second direction, a controller configured to switch the orientation of the distal end portion between an orientation for cleaning a first target face of the object and an orientation for cleaning a second target face of the object, the first target face facing the first direction, the second target face facing the second direction.

19 Claims, 43 Drawing Sheets

(51) Int. Cl.
*B25J 13/08* (2006.01)
*B25J 5/00* (2006.01)

(58) Field of Classification Search
CPC ... B25J 9/1679; A47L 11/4061; A47L 9/0411; A47L 9/0466; A47L 11/206; A47L 2201/022; E03D 9/002; E03D 11/13; Y10S 901/15; Y10S 901/41; G05D 1/0246; G05B 2219/40411
See application file for complete search history.

(56) References Cited

U.S. PATENT DOCUMENTS

| | | | |
|---|---|---|---|
| 2010/0256812 A1* | 10/2010 | Tsusaka | A47L 9/2852 700/254 |
| 2016/0128526 A1 | 5/2016 | Dobrinsky et al. | |
| 2019/0246858 A1* | 8/2019 | Karasikov | B25J 5/007 |

FOREIGN PATENT DOCUMENTS

| | | |
|---|---|---|
| CN | 105407854 | 3/2016 |
| FR | 2923166 | 5/2009 |
| JP | 04-215725 | 8/1992 |
| JP | 2002-129627 | 5/2002 |
| JP | 2005-248591 | 9/2005 |
| JP | 2012-130582 | 7/2012 |
| JP | 2017-533364 | 11/2017 |

OTHER PUBLICATIONS

Matsuzaki et al., Classification of a hybrid control system for robotic tool use, 2013, IEEE, pg. (Year: 2013).*

* cited by examiner

FIG.9
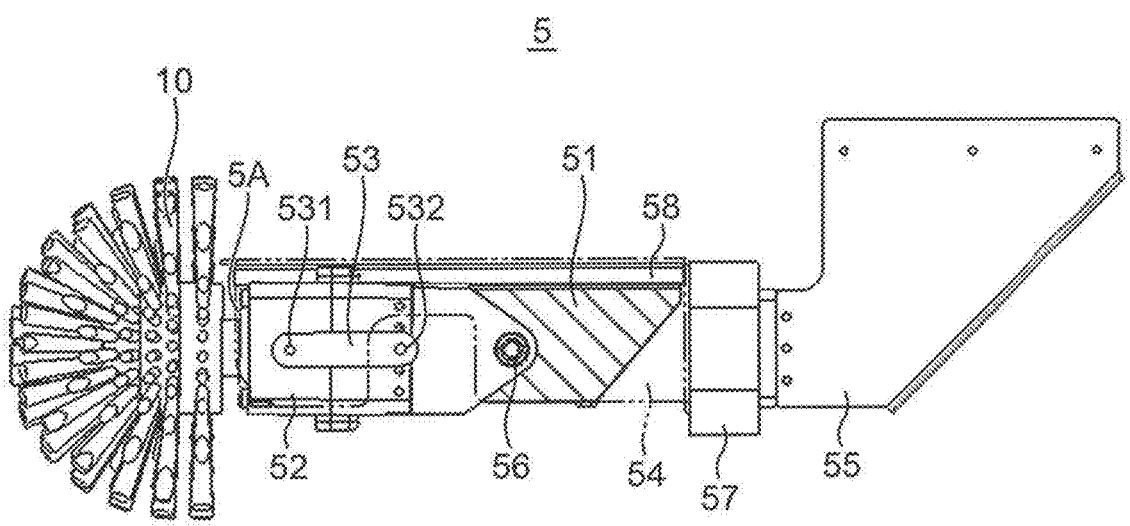
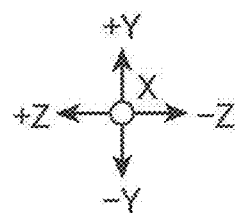

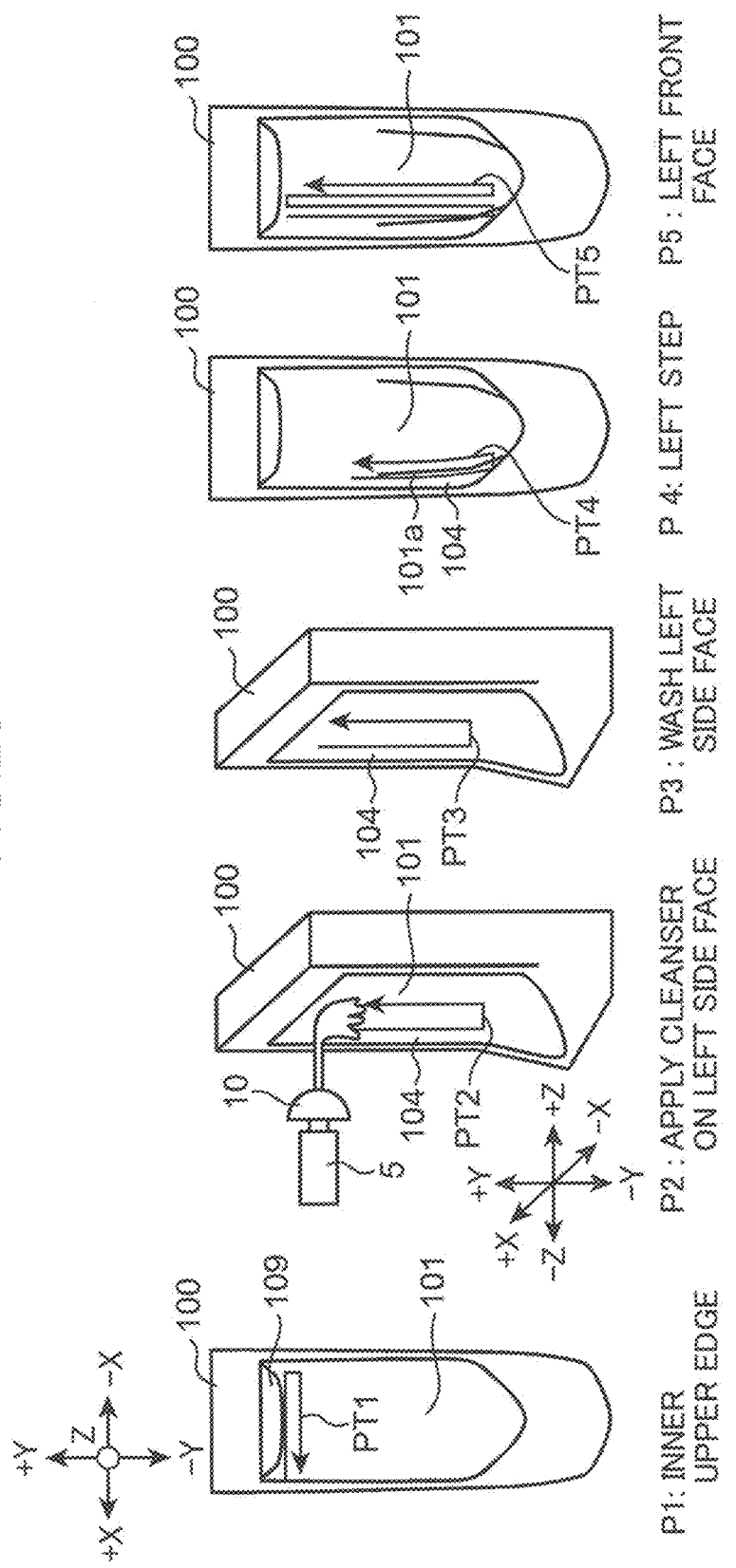

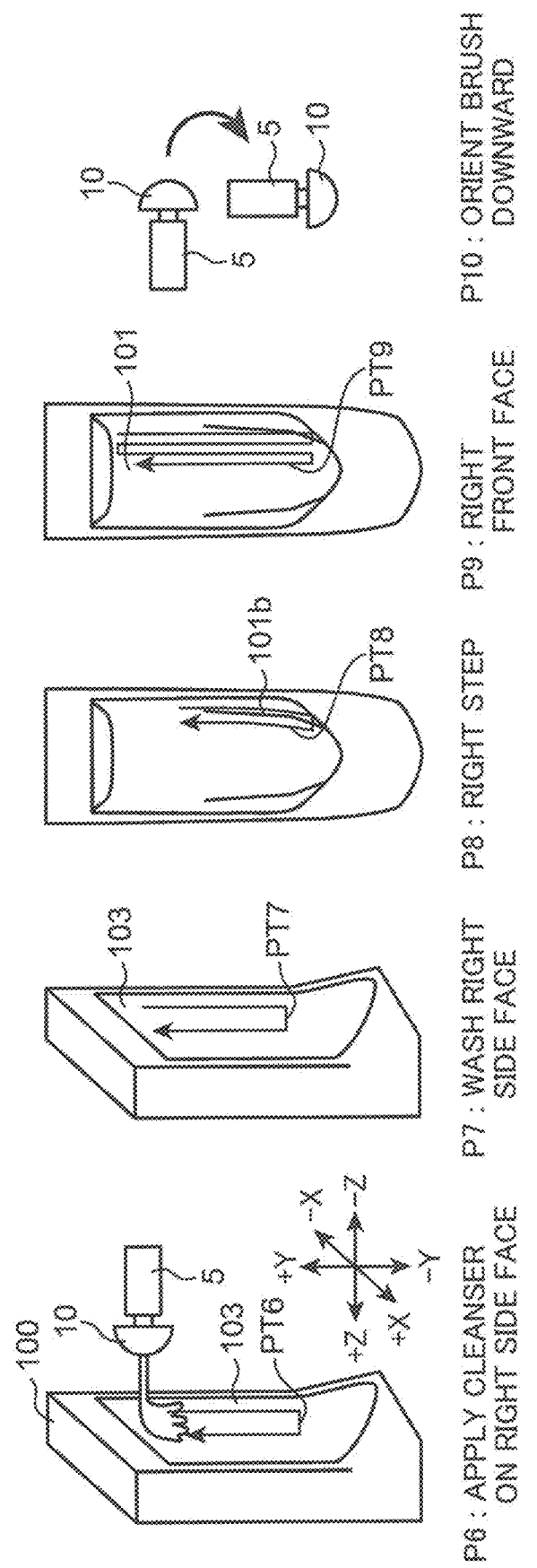

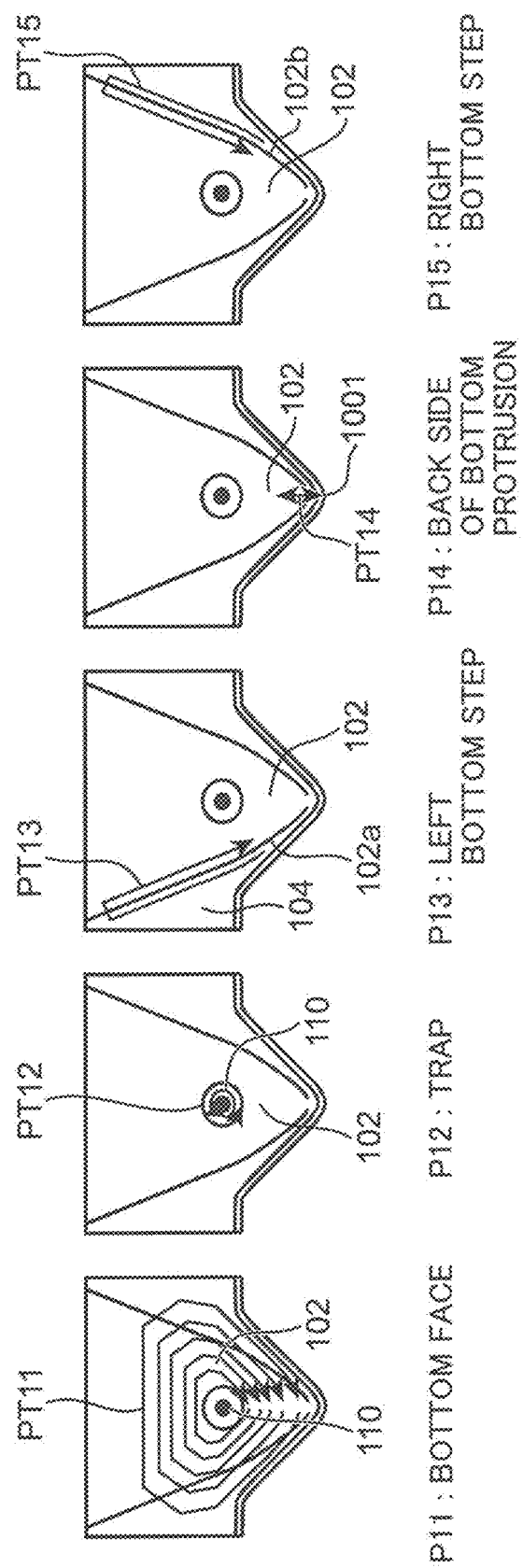

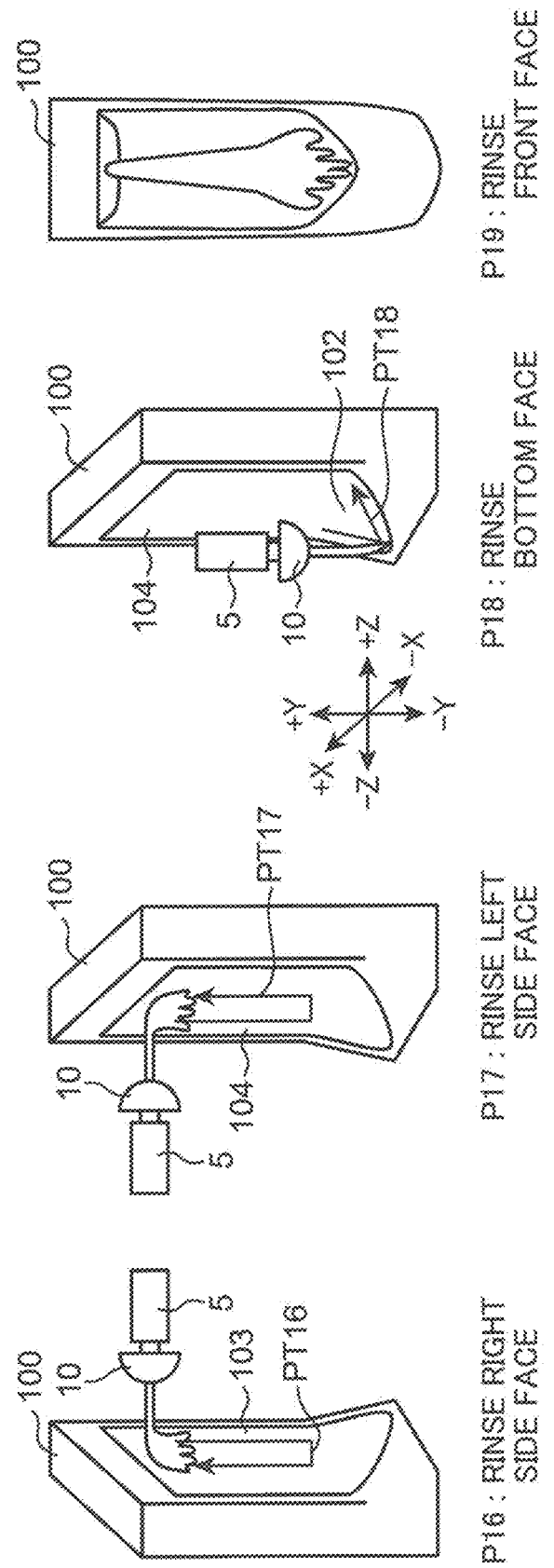

FIG.33

- % : DATA START
- <P1 : INNER UPPER EDGE>
- G90 : DEFINE COORDINATE SYSTEM (ABSOLUTE COORDINATE SYSTEM)
- G94 : SET UNIT FOR FEEDING (/min: PER MINUTE)
- G17 : DEFINE WORK PLANE (XY PLANE)
- G21 : SET UNIT (mm)
- T1 M6 : CHANGE TOOL TO TOOL 1 (NOT APPLICABLE)
- M3 : ORIENT BRUSH HORIZONTALLY
- G54 : SELECT WORK COORDINATE SYSTEM (NOT APPLICABLE)
- *M8 : CLEANSER "ON" (PERFORM APPLYING BY GIVING "OFF" 1 SECOND AFTER "ON")
- G1 F18000 : MOVE LINEARLY WITH FEEDING VELOCITY OF 18000 mm/min (IN EFFECT UNTIL CHANGED)
- X Y Z** : MOVE TO INSTRUCTED COORDINATE POSITION
- S1000 : BRUSH VIBRATION "ON" (IN EFFECT UNTIL "OFF" IS GIVEN)
- *M9 : CLEANSER "OFF" (PERFORM APPLYING; USED IN COMBINATION WITH "ON" GIVEN 1 SECOND EARLIER)
- X Z : MOVE TO INSTRUCTED COORDINATE POSITION (Y COORDINATE POSITION UNCHANGED)
- ~
- ~
- X Y Z** : MOVE TO INSTRUCTED COORDINATE POSITION (Y COORDINATE POSITION ALSO CHANGED)
- X Z : MOVE TO INSTRUCTED COORDINATE POSITION (Y COORDINATE POSITION UNCHANGED)
- ~
- ~
- S0 : STOP BRUSH VIBRATION
- G17 : DEFINE WORK PLANE (XY PLANE)

FIG.34

<P2 : APPLY CLEANSER ON LEFT SIDE FACE
   (CLEANSER KEPT DISCHARGED)>

- G90 : DEFINE COORDINATE SYSTEM (ABSOLUTE COORDINATE SYSTEM)
- G94 : SET UNIT FOR FEEDING (/min : PER MINUTE)
- G17 : DEFINE WORK PLANE (XY PLANE)
- G21 : SET UNIT (mm)
- T1 M6 : CHANGE TOOL TO TOOL 1 (NOT APPLICABLE)
- G54 : SELECT WORK COORDINATE SYSTEM (NOT APPLICABLE)
- G18 : DEFINE WORK PLANE (XZ PLANE)
- G1 F18000 : MOVE LINEARLY WITH FEEDING VELOCITY OF 18000 mm/min
   (IN EFFECT UNTIL CHANGED)
- X Y Z** : MOVE TO INSTRUCTED COORDINATE POSITION

~
  ~

- G17 : DEFINE WORK PLANE (XY PLANE)
- *M8 : CLEANSER APPLY "ON" (STOP APPLYING BY GIVING "OFF"
   1 SECOND AFTER "ON")
- G4 P0.001: PAUSE FOR 1 SECOND (1000 MILLISECONDS)
- *M9 : CLEANSER APPLY "OFF" (STOP APPLYING : USED IN
   COMBINATION WITH "ON" GIVEN 1 SECOND EARLIER)
- *M8: CLEANSER APPLY "ON" (PREPARE FOR APPLYING)

FIG.35

```
<P3 : WASH LEFT SIDE FACE (CLEANSER APPLYING STOPPED)>
·G90 : DEFINE COORDINATE SYSTEM (ABSOLUTE COORDINATE SYSTEM)
·G94 : SET UNIT FOR FEEDING (/min : PER MINUTE)
·G17 : DEFINE WORK PLANE
·G21 : SET UNIT (mm)
·T1 M6 : CHANGE TOOL TO TOOL 1 (NOT APPLICABLE)
·G54 : SELECT WORK COORDINATE SYSTEM (NOT APPLICABLE)
·G18 : DEFINE WORK PLANE (XZ PLANE)
·G1 F18000 : MOVE LINEARLY WITH FEEDING VELOCITY OF 18000 mm/min
             (IN EFFECT UNTIL CHANGED)
·X Y Z** : MOVE TO INSTRUCTED COORDINATE POSITION
·S1000: BRUSH VIBRATION "ON" (IN EFFECT UNTIL "OFF" IS GIVEN)
·X** Y** Z** : MOVE TO INSTRUCTED COORDINATE POSITION
   ~
   ~
·G17 : DEFINE WORK PLANE (XY PLANE)
```

FIG.36

\<P4 : LEFT STEP (BRUSH VIBRATION CONTINUES)\>
·G90 : DEFINE COORDINATE SYSTEM (ABSOLUTE COORDINATE SYSTEM)
·G94 : SET UNIT FOR FEEDING (/min : PER MINUTE)
·G17 : DEFINE WORK PLANE (XY PLANE)
·G21 : SET UNIT (mm)
·T1 M6 : CHANGE TOOL TO TOOL 1 (NOT APPLICABLE)
·G54 : SELECT WORK COORDINATE SYSTEM (NOT APPLICABLE)
·G18 : DEFINE WORK PLANE (XZ PLANE)
·G1 F18000 : MOVE LINEARLY WITH FEEDING VELOCITY OF 18000 mm/min
          (IN EFFECT UNTIL CHANGED)
∗M9 : CLEANSER "OFF" (PERFORM APPLYING: USED IN COMBINATION
      WITH THE LAST COMMAND M8 IN P2)
·X∗∗ Y∗∗ Z∗∗ : MOVE TO INSTRUCTED COORDINATE POSITION
  ∼
  ∼
∗M8 : CLEANSER APPLY "ON" (STOP APPLYING BY GIVING "OFF"
      1 SECOND AFTER "ON")
·G4 P0.001 : PAUSE FOR 1 SECOND (1000 MILLISECONDS)
∗M9 : CLEANSER APPLY "OFF" (STOP APPLYING: USED IN COMBINATION
      WITH "ON" GIVEN 1 SECOND EARLIER)
∗M8 : CLEANSER APPLY "ON" (PREPARE FOR APPLYING)
·X∗∗ Y∗∗ Z∗∗ : MOVE TO INSTRUCTED COORDINATE POSITION
  ∼
  ∼
∗M9 : CLEANSER "OFF" (PERFORM APPLYING)
·X∗∗ Y∗∗ Z∗∗ : MOVE TO INSTRUCTED COORDINATE POSITION
  ∼
  ∼
∗M8 : CLEANSER APPLY "ON" (STOP APPLYING BY GIVING "OFF"
      1 SECOND AFTER "ON")
·G4 P0.001 : PAUSE FOR 1 SECOND (1000 MILLISECONDS)
∗M9 : CLEANSER APPLY "OFF" (STOP APPLYING: USED IN COMBINATION
      WITH "ON" GIVEN 1 SECOND EARLIER)

FIG.37

```
<P5 : LEFT FRONT FACE>
*M8 : CLEANSER APPLY "ON" (PREPARE FOR APPLYING)
·X** Y** Z** : MOVE TO INSTRUCTED COORDINATE POSITION
   ~
   ~
*M9 : CLEANSER "OFF" (PERFORM APPLYING)
·X Y Z** : MOVE TO INSTRUCTED COORDINATE POSITION
   ~
   ~
*M8 : CLEANSER APPLY "ON" (STOP APPLYING BY GIVING "OFF"
       1 SECOND AFTER "ON")
·G4 P0.001 : PAUSE FOR 1 SECOND (1000 MILLISECONDS)
*M9 : CLEANSER APPLY "OFF" (STOP APPLYING: USED IN COMBINATION
       WITH "ON" GIVEN 1 SECOND EARLIER)

*M8 : CLEANSER APPLY "ON" (PREPARE FOR APPLYING)
·X** Y** Z** : MOVE TO INSTRUCTED COORDINATE POSITION
   ~
   ~
·G17 : DEFINE WORK PLANE (XY PLANE)
·S0 : STOP BRUSH VIBRATION
```

FIG.38

<P10, P11: BOTTOM FACE>

- G90 : DEFINE COORDINATE SYSTEM (ABSOLUTE COORDINATE SYSTEM)
- G94 : SET UNIT FOR FEEDING (/min : PER MINUTE)
- G17 : DEFINE WORK PLANE (XY PLANE)
- G21 : SET UNIT (mm)
- T1 M6 : CHANGE TOOL TO TOOL 1 (NOT APPLICABLE)
- G54 : SELECT WORK COORDINATE SYSTEM (NOT APPLICABLE)
- G1 F18000 : MOVE LINEARLY WITH FEEDING VELOCITY OF 18000 mm/min (IN EFFECT UNTIL CHANGED)
- M4 : ORIENT BRUSH DOWNWARD
- X Y Z** : MOVE TO INSTRUCTED COORDINATE POSITION
- *M9 : CLEANSER "OFF" (START APPLYING)
- S1000 : BRUSH VIBRATION "ON" (IN EFFECT UNTIL "OFF" IS GIVEN)
- G2 X Z I K : MOVE TO INSTRUCTED COORDINATE POSITION (MOVE ALONG ARC CENTERED AT COORDINATE POINT (I, K))

~

- G3 X Z I K : MOVE TO INSTRUCTED COORDINATE POSITION (MOVE COUNTER CLOCKWISE ALONG ARC CENTERED AT COORDINATE POINT (I, K))

~

- G1X Y Z** : MOVE TO INSTRUCTED COORDINATE POSITION (MOVE LINEARLY)

~

- *M8 : CLEANSER APPLY "ON" (STOP APPLYING BY GIVING "OFF" 1 SECOND AFTER "ON")
- G4 P0.001 : PAUSE FOR 1 SECOND (1000 MILLISECONDS)
- *M9 : CLEANSER APPLY "OFF" (STOP APPLYING: USED IN COMBINATION WITH "ON" GIVEN 1 SECOND EARLIER)
- *M8 : CLEANSER APPLY "ON" (PREPARE FOR APPLYING)
- G1X Y Z** : MOVE TO INSTRUCTED COORDINATE POSITION (MOVE LINEARLY)

*M9 : CLEANSER "OFF" (PERFORM APPLYING)
·X Y Z** : MOVE TO INSTRUCTED COORDINATE POSITION
  ~
  ~
*M8 : CLEANSER APPLY "ON" (STOP APPLYING BY GIVING "OFF"
      1 SECOND AFTER "ON")
·G4 P0.001 : PAUSE FOR 1 SECOND (1000 MILLISECONDS)
*M9 : CLEANSER APPLY "OFF" (STOP APPLYING: USED IN COMBINATION
      WITH "ON" GIVEN 1 SECOND EARLIER)
*M8 : CLEANSER APPLY "ON" (PREPARE FOR APPLYING)
·G1X Y Z** : MOVE TO INSTRUCTED COORDINATE POSITION
            (MOVE LINEARLY)
  ~
*M9 : CLEANSER "OFF" (PERFORM APPLYING)
·X Y Z** : MOVE TO INSTRUCTED COORDINATE POSITION
  ~
  ~
*M8 : CLEANSER APPLY "ON" (STOP APPLYING BY GIVING "OFF"
      1 SECOND AFTER "ON")
·G4 P0.001 : PAUSE FOR 1 SECOND (1000 MILLISECONDS)
*M9 : CLEANSER APPLY "OFF" (STOP APPLYING: USED IN COMBINATION
      WITH "ON" GIVEN 1 SECOND EARLIER)
*M8 : CLEANSER APPLY "ON" (PREPARE FOR APPLYING)
·G1X Y Z** : MOVE TO INSTRUCTED COORDINATE POSITION
            (MOVE LINEARLY)
  ~
*M9 : CLEANSER "OFF" (PERFORM APPLYING)
·X Y Z** : MOVE TO INSTRUCTED COORDINATE POSITION
  ~
  ~
*M8 : CLEANSER APPLY "ON" (STOP APPLYING BY GIVING "OFF"
      1 SECOND AFTER "ON")
·G4 P0.001 : PAUSE FOR 1 SECOND (1000 MILLISECONDS)
*M9 : CLEANSER APPLY "OFF" (STOP APPLYING: USED IN COMBINATION
      WITH "ON" GIVEN 1 SECOND EARLIER)
·G1 Y** : MOVE TO INSTRUCTED COORDINATE POSITION
       (ONLY IN Y DIRECTION)
·X Y Z** : MOVE TO INSTRUCTED COORDINATE POSITION

FIG.40

<P12 : TRAP>
- G90 : DEFINE COORDINATE SYSTEM (ABSOLUTE COORDINATE SYSTEM)
- G94 : SET UNIT FOR FEEDING (/min : PER MINUTE)
- G17 : DEFINE WORK PLANE (XY PLANE)
- G21 : SET UNIT (mm)
- T1 M6 : CHANGE TOOL TO TOOL 1 (NOT APPLICABLE)
- G54 : SELECT WORK COORDINATE SYSTEM (NOT APPLICABLE)
- G18 : DEFINE WORK PLANE (XZ PLANE)
- G1 F18000 : MOVE LINEARLY WITH FEEDING VELOCITY OF 18000 mm/min
  (IN EFFECT UNTIL CHANGED)
- X Y Z** : MOVE TO INSTRUCTED COORDINATE POSITION
  ~
  ~
- G17 : DEFINE WORK PLANE (XY PLANE)

FIG.41

<P13 : LEFT BOTTOM STEP, P14 BACK SIDE OF BOTTOM PROTRUSION,
     P15 RIGHT BOTTOM STEP>
·G90 : DEFINE COORDINATE SYSTEM (ABSOLUTE COORDINATE SYSTEM)
·G94 : SET UNIT FOR FEEDING (/min : PER MINUTE)
·G17 : DEFINE WORK PLANE (XY PLANE)
·G21 : SET UNIT (mm)
·T1 M6 : CHANGE TOOL TO TOOL 1 (NOT APPLICABLE)
·G54 : SELECT WORK COORDINATE SYSTEM (NOT APPLICABLE)
·G18 : DEFINE WORK PLANE (XZ PLANE)
·G1 F18000 : MOVE LINEARLY WITH FEEDING VELOCITY OF 18000 mm/min
            (IN EFFECT UNTIL CHANGED)
·X Y Z** : MOVE TO INSTRUCTED COORDINATE POSITION
·S1000 : BRUSH VIBRATION "ON" (IN EFFECT UNTIL "OFF" IS GIVEN)
·X Y Z** : MOVE TO INSTRUCTED COORDINATE POSITION
   ~
   ~
·G17 : DEFINE WORK PLANE (XY PLANE)
·S0 : STOP BRUSH VIBRATION

FIG.42

<P16 : RINSE RIGHT SIDE FACE>
·G90 : DEFINE COORDINATE SYSTEM (ABSOLUTE COORDINATE SYSTEM)
·G94 : SET UNIT FOR FEEDING (/min : PER MINUTE)
·G17 : DEFINE WORK PLANE (XY PLANE)
·G21 : SET UNIT (mm)
·T1 M6 : CHANGE TOOL TO TOOL 1 (NOT APPLICABLE)
·G54 : SELECT WORK COORDINATE SYSTEM (NOT APPLICABLE)
·G18 : DEFINE WORK PLANE (XZ PLANE)
·G1 F18000 : MOVE LINEARLY WITH FEEDING VELOCITY OF 18000 mm/min
             (IN EFFECT UNTIL CHANGED)
∗M3 : ORIENT BRUSH HORIZONTALLY (DOWNWARD BY M4)
·X∗∗ Y∗∗ Z∗∗ : MOVE TO INSTRUCTED COORDINATE POSITION
∗M7 : START WATER DISCHARGE
·X∗∗ Y∗∗ Z∗∗ : MOVE TO INSTRUCTED COORDINATE POSITION
 ～
∗M9 : STOP WATER DISCHARGE
·G17 : DEFINE WORK PLANE (XY PLANE)

FIG.43

<P18 : RINSE BOTTOM FACE>
·G90 : DEFINE COORDINATE SYSTEM (ABSOLUTE COORDINATE SYSTEM)
·G94 : SET UNIT FOR FEEDING (/min : PER MINUTE)
·G17 : DEFINE WORK PLANE (XY PLANE)
·G21 : SET UNIT (mm)
·T1 M6 : CHANGE TOOL TO TOOL 1 (NOT APPLICABLE)
·G54 : SELECT WORK COORDINATE SYSTEM (NOT APPLICABLE)
·G18 : DEFINE WORK PLANE (XZ PLANE)
·G1 F18000 : MOVE LINEARLY WITH FEEDING VELOCITY OF 18000 mm/min
            (IN EFFECT UNTIL CHANGED)
*M4 : ORIENT BRUSH DOWNWARD
·X Y Z** : MOVE TO INSTRUCTED COORDINATE POSITION
*M7 : START WATER DISCHARGE
·X Y Z** : MOVE TO INSTRUCTED COORDINATE POSITION
*M9 : STOP WATER DISCHARGE
·G17 : DEFINE WORK PLANE (XY PLANE)

<INITIATING>
·G0 X0.0 Z0.0 : RETURN TO ORIGIN POINT REGARDING X AXIS AND Z AXIS
*M3 : ORIENT BRUSH HORIZONTALLY
·Y0.0 : RETURN TO ORIGIN POINT REGARDING Y AXIS
*M30 : END OF DATA
·% : DATA END

CLEANING ROBOT

FIELD OF THE INVENTION

The present invention relates to a cleaning robot that cleans an object to be cleaned.

BACKGROUND ART

In recent years, a cleaning robot that cleans a floor while autonomously moving has been known. For example, JP 2012-130582 A discloses a cleaning apparatus that includes three rotatable brushes and controls the rotational direction and the tilt angle against the floor of the rotational axis of each of the three rotating brushes. The cleaning apparatus polishes the floor while moving in an intended direction using a rotational friction force generated between the three rotating brushes and the floor, the rotational friction force changing according to the rotational directions and the rotational angles of the rotatable brushes.

However, changing the orientation of the brushes for a plurality of target faces facing different directions is not disclosed regarding the cleaning apparatus described in JP 2012-130582 A. Thus, a problem remains that a stain on a target face cannot sufficiently be cleaned off.

SUMMARY OF THE INVENTION

An object of the disclosure is to provide a cleaning robot that can sufficiently clean off a stain on an object having a plurality of target faces facing different directions.

One embodiment of the disclosure is a cleaning robot for cleaning an object, the cleaning robot comprising: an arm including a distal end portion to which a brush is attached, the arm extending in a first direction parallel to a horizontal direction; a driver connected to the arm, the driver including a first mechanism that moves the arm in the first direction, a second mechanism that moves the arm in a second direction parallel to a vertical direction perpendicular to the first direction, and a third mechanism that moves the arm in a third direction perpendicular to both the first direction and the second direction, the arm being configured to switch an orientation of the distal end portion; and a controller configured to switch the orientation of the distal end portion between an orientation for cleaning a first target face of the object and an orientation for cleaning a second target face of the object, the first target face facing the first direction, the second target face facing the second direction.

BRIEF DESCRIPTION OF THE DRAWINGS

FIG. 9 is an X directional view of the arm according to a first aspect;

FIG. 29 illustrates five processes sequentially performed in a cleaning sequence;

FIG. 30 illustrates five processes sequentially performed after the cleaning sequence illustrated in FIG. 29;

FIG. 31 illustrates five processes sequentially performed after the cleaning sequence illustrated in FIG. 30;

FIG. 32 illustrates four processes sequentially performed after the cleaning sequence illustrated in FIG. 31;

FIG. 33 illustrates a G-code of a process P1;

FIG. 34 illustrates a G-code of a process P2;

FIG. 35 illustrates a G-code of a process P3;

FIG. 36 illustrates a G-code of a process P4;

FIG. 37 illustrates a G-code of a process P5;

FIG. 38 illustrates a G-code of processes P10 and P11;

FIG. 39 illustrates a G-code of the processes P10 and P11;

FIG. 40 illustrates a G-code of a process P12;

FIG. 41 illustrates a G-code of a process P13, a process P14, and a process P15;

FIG. 42 illustrates a G-code of a process P16; and

FIG. 43 illustrates a G-code of a process P18.

DESCRIPTION OF EMBODIMENTS

Background of the Disclosure

Figure 1:
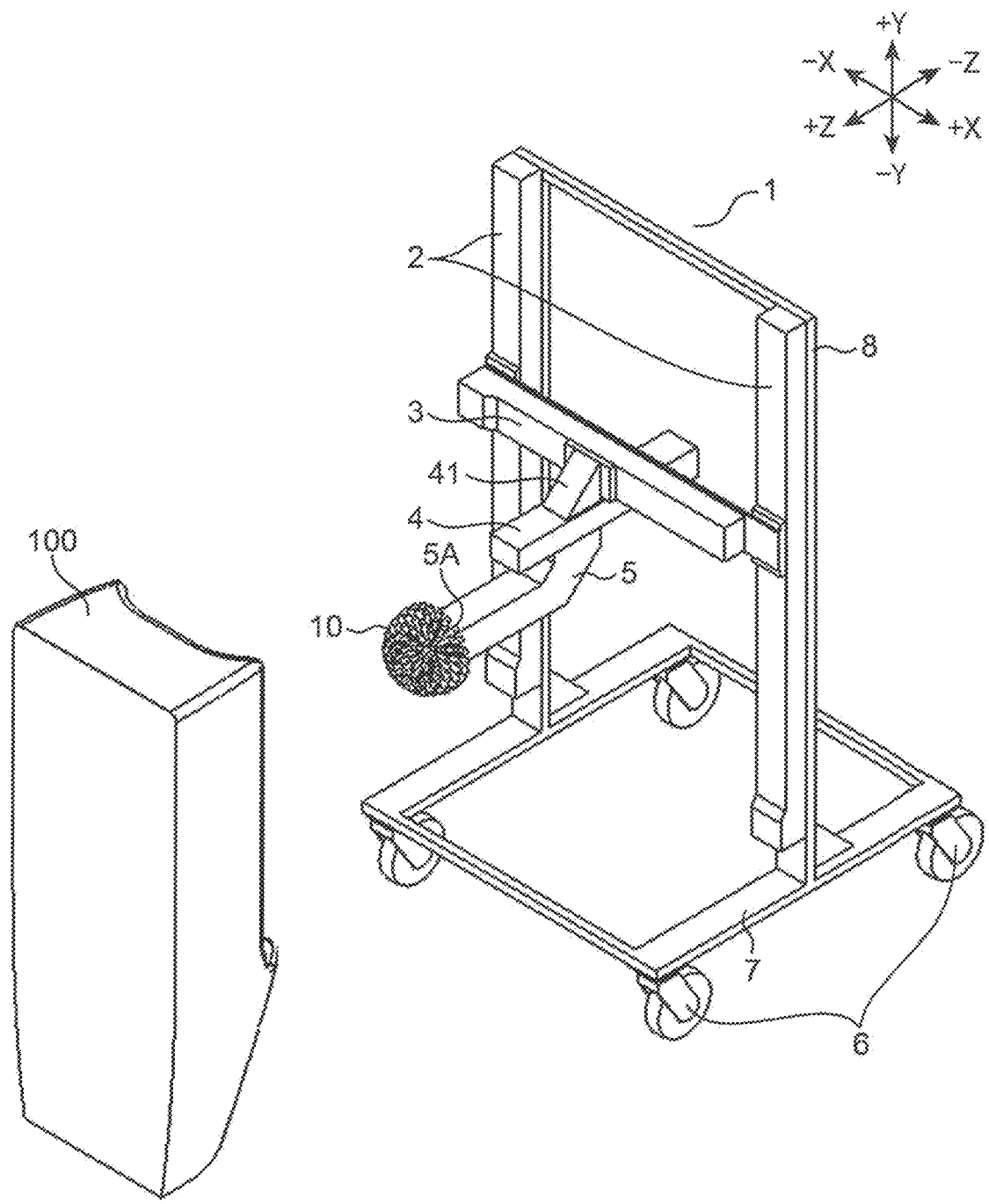
FIG. 1 illustrates major portions of a cleaning robot according to an embodiment of the disclosure.

The inventor has studied a cleaning robot that autonomously cleans a toilet in a lavatory in a public facility such as a station and an airport. Specifically, studies have been made for a cleaning robot including an arm that is movable in three axial directions and has a brush attached to the distal end portion to discharge a cleanser and water. The robot cleans a toilet by moving the brush in contact with an inner face, which is a target face, of the toilet.

There are various types of toilet provided in a public lavatory, for example, a Japanese style toilet or a Western style toilet. Among these toilets, a urinal in which a male urinates has a plurality of target faces facing different directions. For example, the target faces are a first target face facing a person and a second target face extending horizontally and provided with a drain hole.

If the orientation of the distal end portion of the arm is fixed, the front portion of the brush might not be able to contact a certain target face. In such a case, the brush might not contact the target face with a sufficient force, and a stain on the target face may not be cleaned off sufficiently.

JP 2012-130582 A described above discloses a cleaning apparatus including three rotatable brushes disposed at vertices of equilateral triangle in a top view with each of the three brushes provided with a tilt axis extending perpendicular to the rotational axis of the brush.

The cleaning apparatus disclosed in JP 2012-130582 A is, however, used for polishing a floor. In JP 2012-130582 A, the brush is tilted about the tilt axis to create a high friction region between the brush and the floor for a purpose of moving the cleaning apparatus to an intended direction, not for a purpose of tilting the brush according to the direction which a target face faces. Thus, polishing a plurality of target faces facing different directions is not considered at all in JP 2012-130582 A. Accordingly, a stain on the object having a plurality of target faces facing different directions cannot sufficiently be cleaned off by the art disclosed in JP 2012-130582 A.

The disclosure is made to solve the problem. An object of the disclosure is to provide a cleaning robot that can sufficiently clean off a stain on an object having a plurality of target faces facing different directions.

One embodiment of the disclosure is a cleaning robot for cleaning an object, the cleaning robot comprising: an arm including a distal end portion to which a brush is attached, the arm extending in a first direction parallel to a horizontal direction; a driver connected to the arm, the driver including a first mechanism that moves the arm in the first direction, a second mechanism that moves the arm in a second direction parallel to a vertical direction perpendicular to the first direction, and a third mechanism that moves the arm in a third direction perpendicular to both the first direction and the second direction, the arm being configured to switch an orientation of the distal end portion; and a controller configured to switch the orientation of the distal end portion between an orientation for cleaning a first target face of the object and an orientation for cleaning a second target face of the object, the first target face facing the first direction, the second target face facing the second direction.

The configuration, which includes the arm movable in the first direction, the second direction, and the third direction perpendicular to each other and the brush attached to the distal end portion of the arm, allows the brush to be moved arbitrarily along the target face.

The orientation of the distal end portion of the arm is switched between an orientation for cleaning the first target face facing the first direction and an orientation for cleaning the second target face facing the second direction. Thus, the brush is oriented to a direction suitable for the target face, so that the brush can contact the target face with a suitable force. Accordingly, a stain on the object having a plurality of target faces facing different directions can sufficiently be cleaned off using the configuration.

In the embodiment, the arm may include a joint, and the controller may orient the distal end portion to face the first target face when cleaning the first target face and orient the distal end to face the second target face when cleaning the second target face.

When cleaning the first target face with the configuration, the distal end portion of the arm faces the first target face to orient the front portion of the brush toward the first target face. When cleaning the second target face, the distal end portion of the arm faces the second target face to orient the front portion of the brush toward the second target face. In such a manner, the brush can contact the first target face and the second target face each with a suitable force to sufficiently clean off stains on the first target face and the second target face.

In the embodiment, the arm may include a first member extending in the first direction and a second member pivotally attached to the first member via the joint and including the distal end portion, and the joint may be switchable a position between a first position in which the second member extends in the first direction and a second position in which the second member extends in the second direction.

In the configuration, the joint is switchable the position between a first position in which the second member extends in the first direction and a second position in which the second member extends in the second direction. The first position orients the front portion of the brush to face the first target face, and the second position orients the front portion of the brush to face the second target face.

The embodiment may further include a brush driver to rotate the brush about the longitudinal direction of the arm.

The configuration, which allows the brush to rotate about the longitudinal direction of the arm, enables cleaning the target face with the rotating brush.

In the embodiment, the brush driver may alternately switch the rotational direction of the brush, thereby vibrating the brush.

In the configuration, the target face is cleaned while alternately switching the rotational direction of the brush, and thus spattering of liquid caused by the brush is suppressed compared to rotating the brush in a single rotational direction.

In the embodiment, the controller may fix the orientation of the distal end portion toward the first direction when cleaning the first target face.

In the configuration, when cleaning the first target face, the orientation of the distal end portion of the arm is fixed in the first direction, so the direction of the distal end portion of the arm can be maintained in a fixed state. Accordingly, the brush can contact the first target face with a suitable force to sufficiently clean off a stain from the first target face.

In the embodiment, the controller may fix the orientation of the distal end portion to the second direction when cleaning the second target face.

In the configuration, when cleaning the second target face, the orientation of the distal end portion of the arm is fixed to the second direction, so the distal end portion of the arm can be maintained in a fixed state. Accordingly, the brush can contact the second target face with a suitable force to sufficiently clean off a stain from the second target face.

In the embodiment, the controller may switch the orientation of the distal end portion when an operation is switched between cleaning of the first target face and cleaning of the second target face.

In the configuration, the orientation of the distal end portion of the arm is switched when an operation is switched between cleaning of the first target face and cleaning of the second target face, that is, the orientation of the distal end portion of the arm can be kept fixed while cleaning either of the first target face and the second target face. Accordingly, the brush can contact the first target face and the second target face each with a suitable force to sufficiently clean off stains from the first target face and the second target face.

The embodiment may further include a cleanser discharger configured to discharge a cleanser from a front portion of the brush, and a water discharger configured to discharge water from the front portion of the brush. The controller is capable of performing a cleanser applying process to apply the cleanser on the object by controlling the cleanser discharger, and a rinsing process to wash off the cleanser applied on the object with the water by controlling the water discharger, and when cleaning the first target face, the rinsing process may not be performed after performing the cleanser applying process.

Many urinals for males have an automated cleaning function to automatically let water flow on the first target face when detecting the leaving of a person. The cleanser applied on the first target face of such a toilet is washed off by the automated cleaning function.

Thus, in the embodiment, no rinsing process is performed after finishing the cleanser applying process in the cleaning of the first target face. Accordingly, the cleanser applied on the first target face is washed off without performing a rinsing process, so that the number of process steps can be reduced.

The embodiment may further include a cleanser discharger configured to discharge a cleanser from a front portion of the brush. When cleaning a third target face facing the third direction, the controller may orient the distal end portion toward the first direction and keep a predetermined distance between the third target face and the brush in a view looking the third direction while causing the cleanser discharger to apply the cleanser.

Since the third target face faces the third direction, the cleanser might not be applied on the whole region of the third target face by discharging the cleanser from the front portion of the brush in a state where the brush enters the third target surface as viewed from the third direction and the front portion of the brush is close to the first target face. In the embodiment, the cleanser is applied with the distal end portion of the arm oriented toward the first direction with the brush separated from the third target face by the predetermined distance in a view looking the third direction, and thus the cleanser can sufficiently be applied on the whole region of the third target face.

In the embodiment, the controller may drive the driver to move the brush according to route information of the brush, the route information being predetermined based on a shape of the object.

In the embodiment, which moves the brush according to the route information, the brush can be moved in such a manner to leave no portion unpolished.

The embodiment may further include a camera configured to capture an image of the object. The controller may derive a predetermined feature portion of the object from an image captured by the camera, compare a location of the derived feature portion with a predetermined location of the feature portion determined under a condition where a coordinate system of the cleaning robot is not shifted from the object, calculate a shift of the coordinate system from the object by the comparison, and correct the route information based on the shift.

In the configuration, which corrects the route information based on the shift of the coordinate system of the cleaning robot from the object, the brush can be positioned correctly to the target face.

In the embodiment, the object may be a urinal for males.

In the configuration, a stain on a urinal for males can sufficiently be cleaned off.

According to the disclosure, a component that manifests a feature of the cleaning robot can be provided by a program executed by a computer or by a method. It goes without saying that such a program can be distributed via a computer-readable non-rewritable recording medium, such as a CD-ROM, or a communication network, such as the Internet.

An embodiment described below is a specific example of the disclosure. Values, shapes, components, steps, and orders of the steps described in the embodiment below, for example, are illustrated by means of illustration and not by means of limiting the scope of the disclosure. Among the components of the following embodiment, the component not included in an independent claim describing the broadest concept is described as a component arbitrarily employed. Any embodiment can be used in combination with any other embodiments.

Embodiments

A cleaning robot according to an embodiment of the disclosure is described with reference to the drawings. FIG. 1 illustrates major portions of a cleaning robot 1 according to the embodiment of the disclosure. In this specification, the direction toward the upper side of the cleaning robot 1 is referred to as +Y direction and the direction toward the lower side of the cleaning robot 1 is referred to as -Y direction. The +Y direction and the -Y direction are collectively referred to as Y direction. The direction toward the front side of the cleaning robot 1 is referred to as +Z direction and the direction toward the rear side of the cleaning robot 1 is referred to as -Z direction. The +Z direction and the -Z direction are collectively referred to as Z direction. In a view looking the +Z direction, the direction toward the left side is referred to as +X direction and the direction toward the right side is referred to as -X direction. The +X direction and the -X direction are collectively referred to as X direction.

To clean a toilet 100, the cleaning robot 1 faces the toilet 100 and polishes an inner face of the toilet 100 with a brush 10. The toilet 100 is a urinal to which a male urines. The cleaning robot 1 suitable for cleaning the urinal for males can also be used for cleaning a Western style toilet or a Japanese style toilet that can be used for both stool and urine. The cleaning robot 1 will be described below for an example situation of cleaning the urinal for males.

X direction, Y direction, and Z direction are perpendicular to each other. Z direction is an example of a first direction parallel to a horizontal direction. Y direction is an example of a second direction parallel to a vertical direction perpendicular to the first direction. X direction is an example of a third direction perpendicular to both the first direction and second direction.

The cleaning robot 1 includes a pair of Y sliders 2, an X slider 3, a Z slider 4, an arm 5, casters 6, a horizontal frame 7, and a vertical frame 8. A pair of the Y sliders 2, the X slider 3, and the Z slider 4 are examples of a driver. The Z slider 4 is an example of a first mechanism that moves the arm 5 along the first direction. A pair of the Y sliders 2 is an example of a second mechanism that moves the arm 5 along the second direction. The X slider 3 is an example of a third mechanism that moves the arm 5 along the third direction.

The horizontal frame 7 has a square shape constituting a bottom surface of the cleaning robot 1. The shape of the horizontal frame 7 is not particularly limited. Instead of a frame, the horizontal frame 7 may take a form of a flat plane. The vertical frame 8 includes a pair of vertical members provided on the horizontal frame 7 to extend in Y direction, and a horizontal member connecting the distal end portions of a pair of the vertical members and extending parallel to X direction. The vertical frame 8 includes a pair of the vertical members and the horizontal member as an example configuration. The form of the vertical frame 8 is not limited and may include a flat plane member.

Each of a pair of the Y sliders 2 is a member that extends in Y direction and slides the arm 5 along Y direction. A pair of the Y sliders 2 is each attached to a face facing the +Z direction of one of a pair of the vertical members constituting the vertical frame 8.

The casters 6 are members allowing the cleaning robot 1 to slide and attached to bottom faces of four corners of the horizontal frame 7. Although four casters 6 are provided as an example, the number of the casters 6 may be three, five, or more than five.

The X slider 3 is a member that slides the arm 5 along Y direction. The X slider 3 extends in X direction, and is slidably attached to a pair of the Y sliders 2 to move along Y direction. A holder 41 having a form of a triangular pillar is fixed to the top face of the Z slider 4 and slidably attached to the X slider 3 to move along X direction. With this configuration, the X slider 3 can slide the arm 5 along X direction by sliding the Z slider 4 along X direction.

The Z slider 4 is a member that slides the arm 5 along Z direction. The Z slider 4 extends in Z direction. The arm 5 is slidably attached to a lower face of the Z slider 4 to move along Z direction.

The arm 5 has a shape extending toward the +Z direction. The brush 10 is attached to a distal end portion 5A of the arm 5. The Z slider 4 is attached to a proximal end of the arm 5. The arm 5 includes a joint allowing switching of the orientation of the distal end portion 5A. The distal end portion 5A is a distal end face of the arm 5.

The brush 10 is detachably attached to the distal end portion 5A of the arm 5. The brush 10 is rotatably attached to the distal end portion 5A of the arm 5 to rotate about the longitudinal direction of the arm 5. The brush 10 has a domed shape. The arm 5 makes the brush 10 to contact an inner face of the toilet 100, and the brush 10 moves across the entire region of the inner face to clean off a stain on the inner face.

Figure 2:
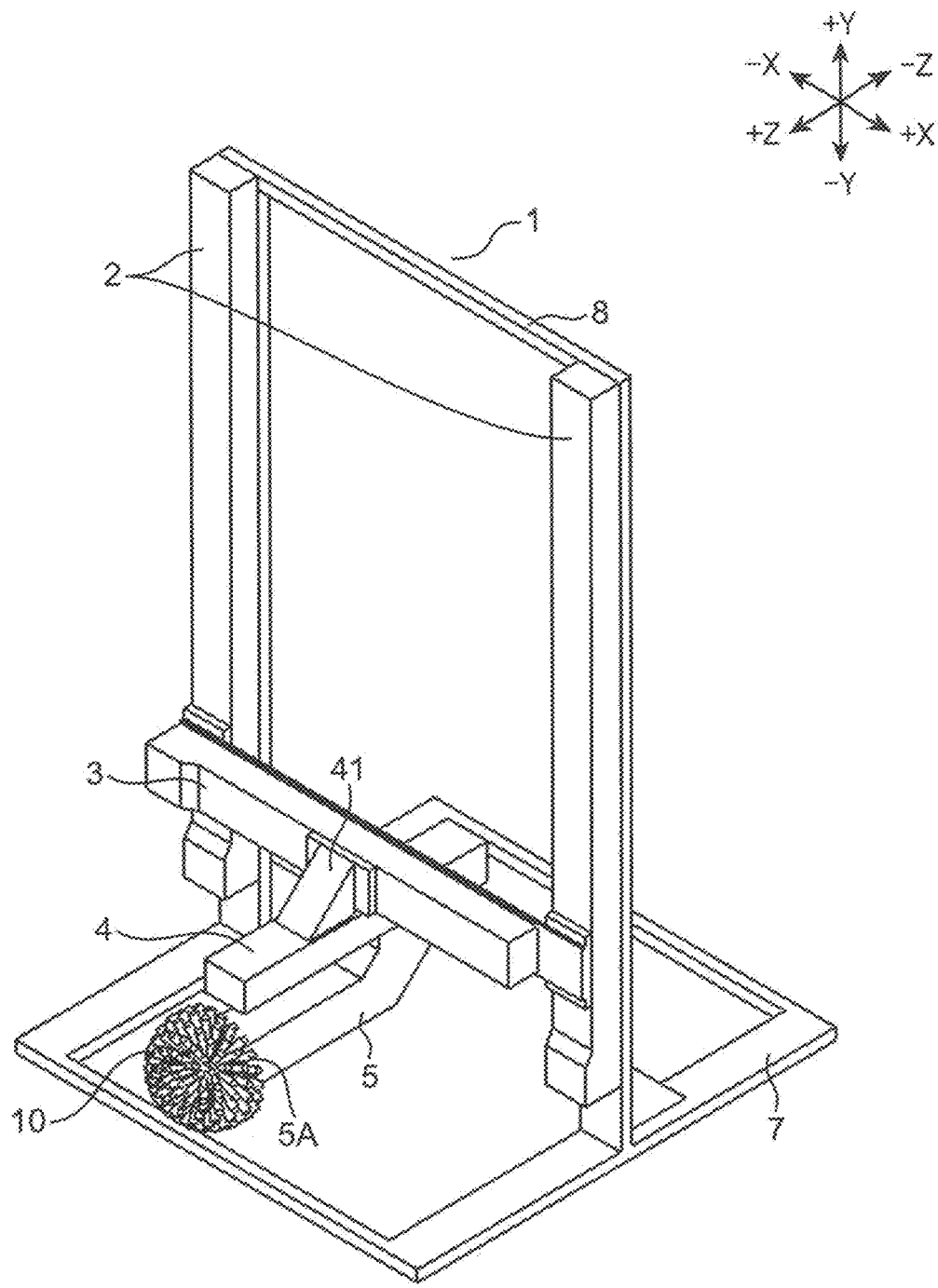
FIG. 2 illustrates an X slider that has been slid to a lower side along Y direction.
Figure 3:
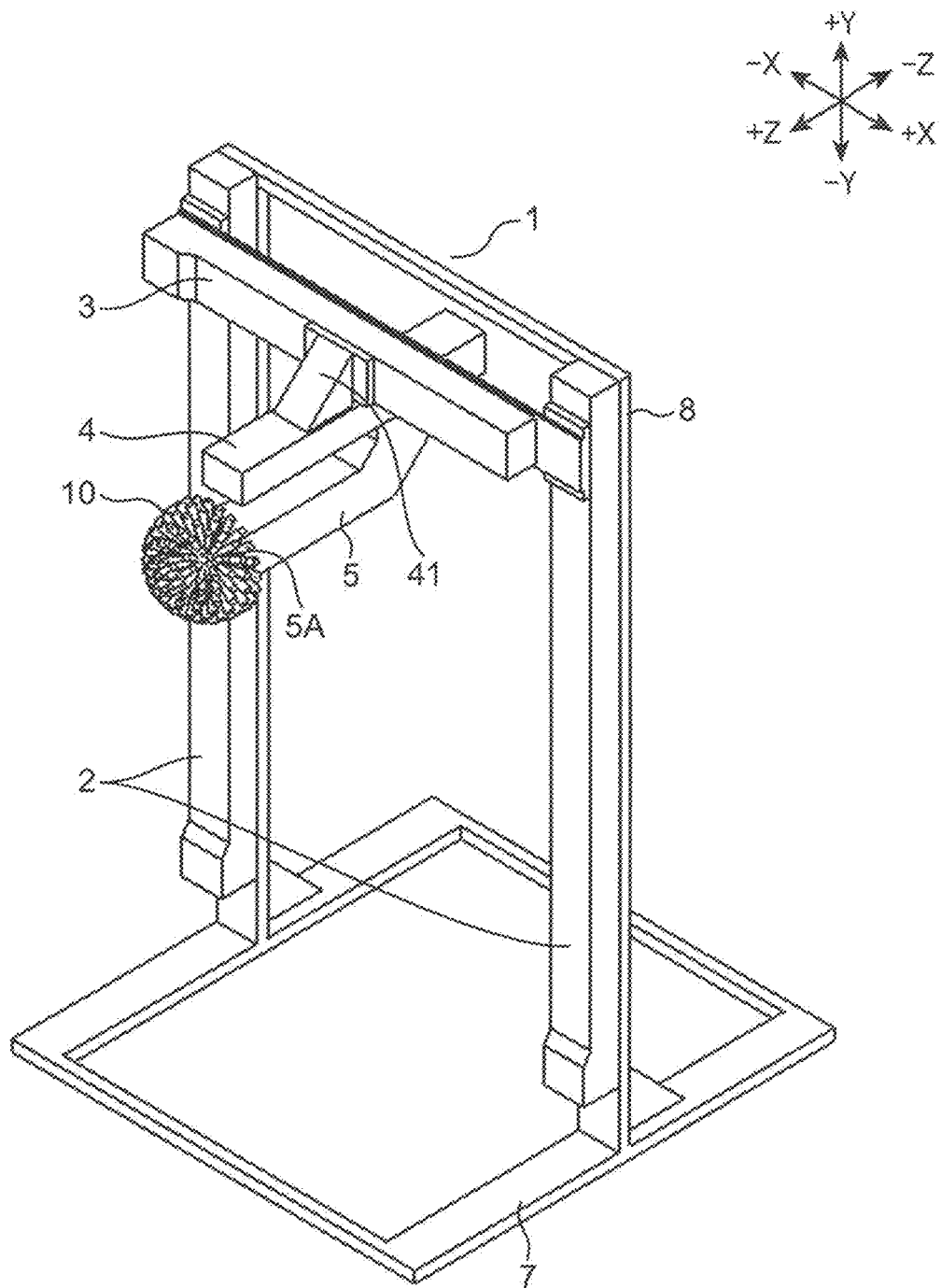
FIG. 3 illustrates the X slider that has been slid to an upper side along Y direction.

FIG. 2 illustrates the X slider 3 that has been slid to the lower side along Y direction. FIG. 3 illustrates the X slider 3 that has been slid to the upper side along Y direction. As illustrated in FIGS. 2 and 3, the X slider 3 is slidable along a pair of the Y sliders 2 from the lower end to the upper end. Thus, the arm 5 can be positioned anywhere between the upper end and the lower end of a pair of the Y sliders 2.

Figure 4:
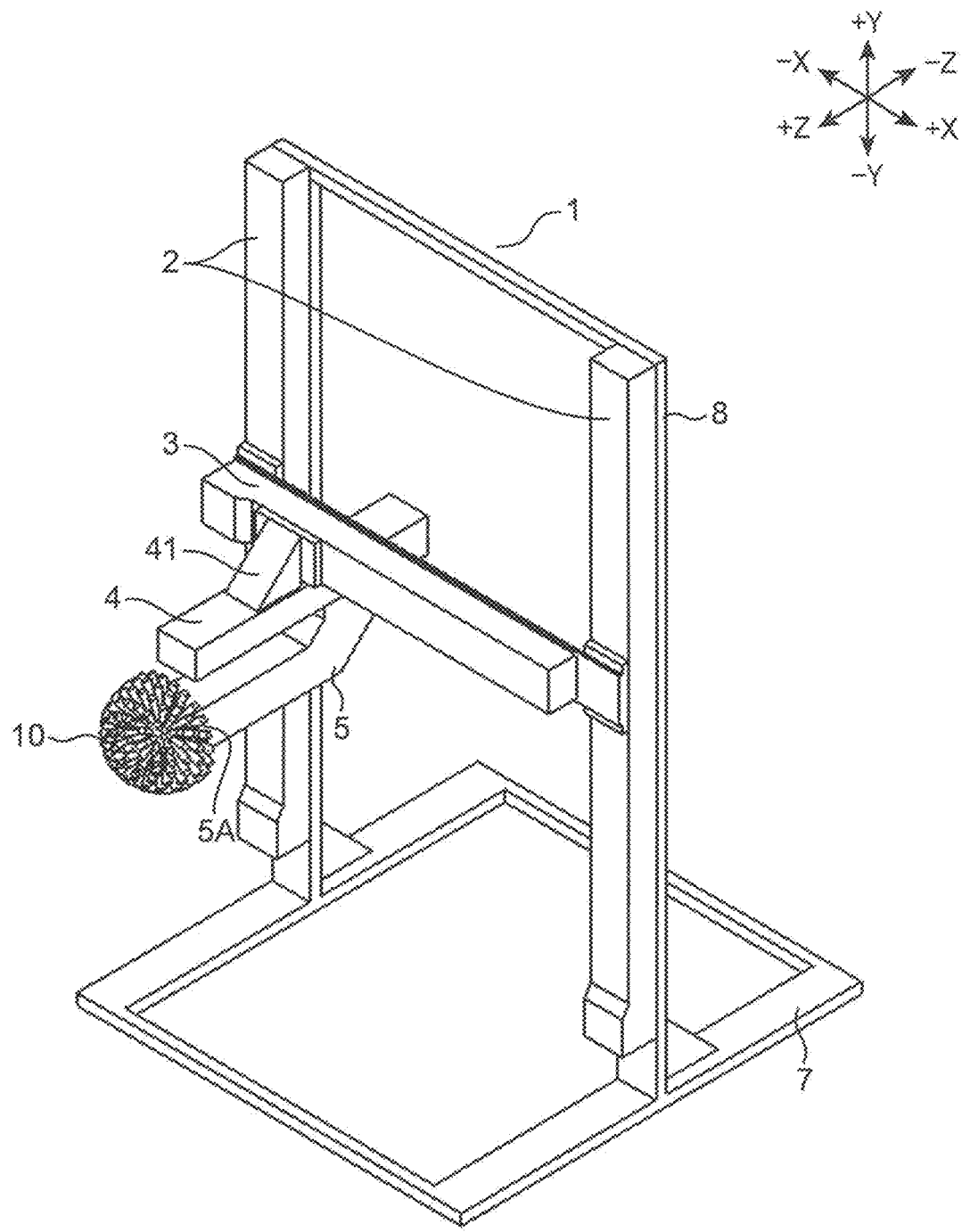
FIG. 4 illustrates a Z slider that has been slid to a right end along X direction.
Figure 5:
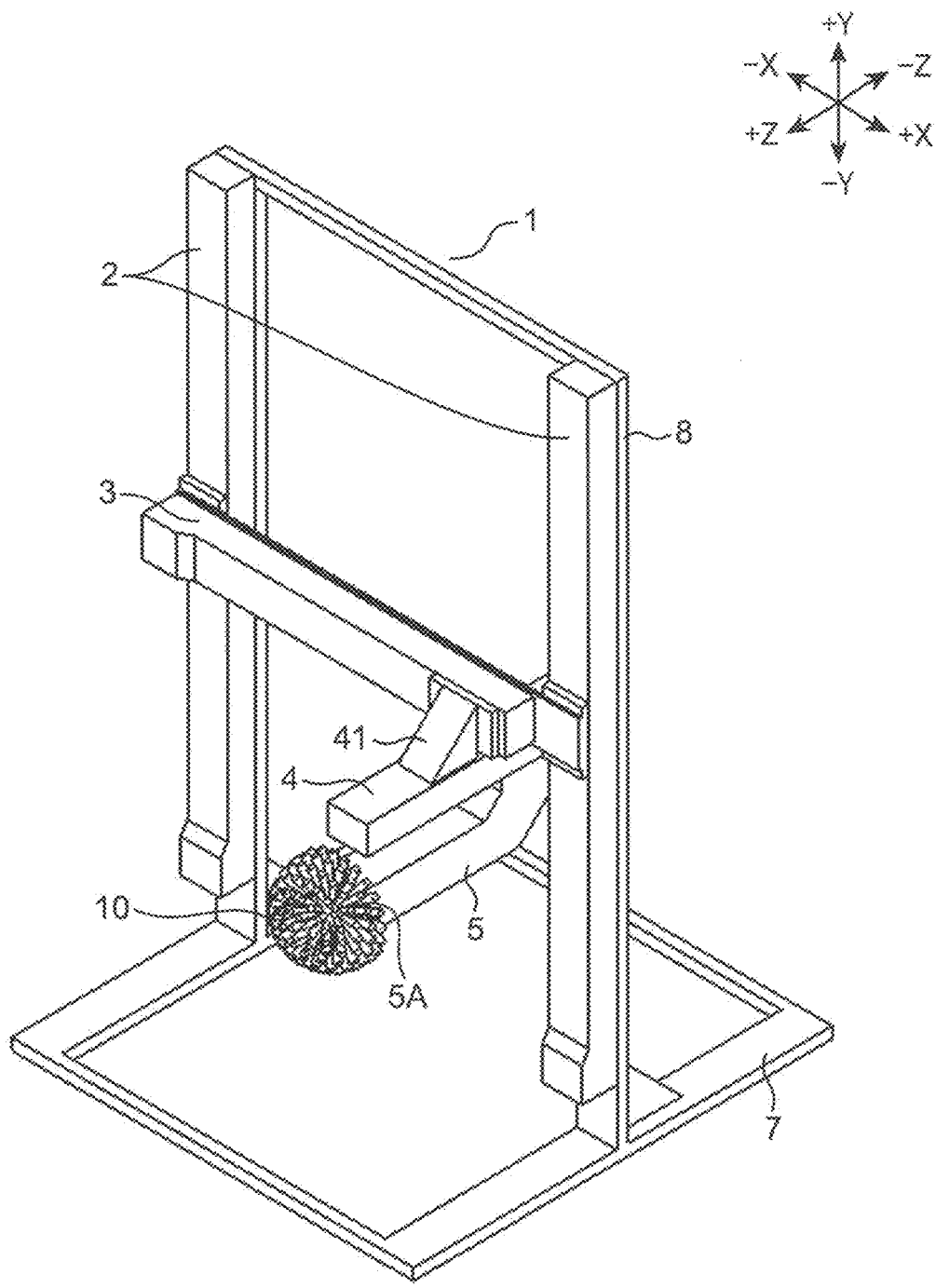
FIG. 5 illustrates the Z slider that has been slid to a left end along X direction.

FIG. 4 illustrates the Z slider 4 that has been slid to the right end along X direction. FIG. 5 is the Z slider 4 that has been slid to the left end along X direction. As illustrated in FIGS. 4 and 5, the Z slider 4 slidably attached to the X slider 3 via the holder 41 can slide between the left end and the right end of the X slider 3. Thus, the arm 5 can be positioned anywhere between the left end and the right end of the X slider 3.

Figure 6:
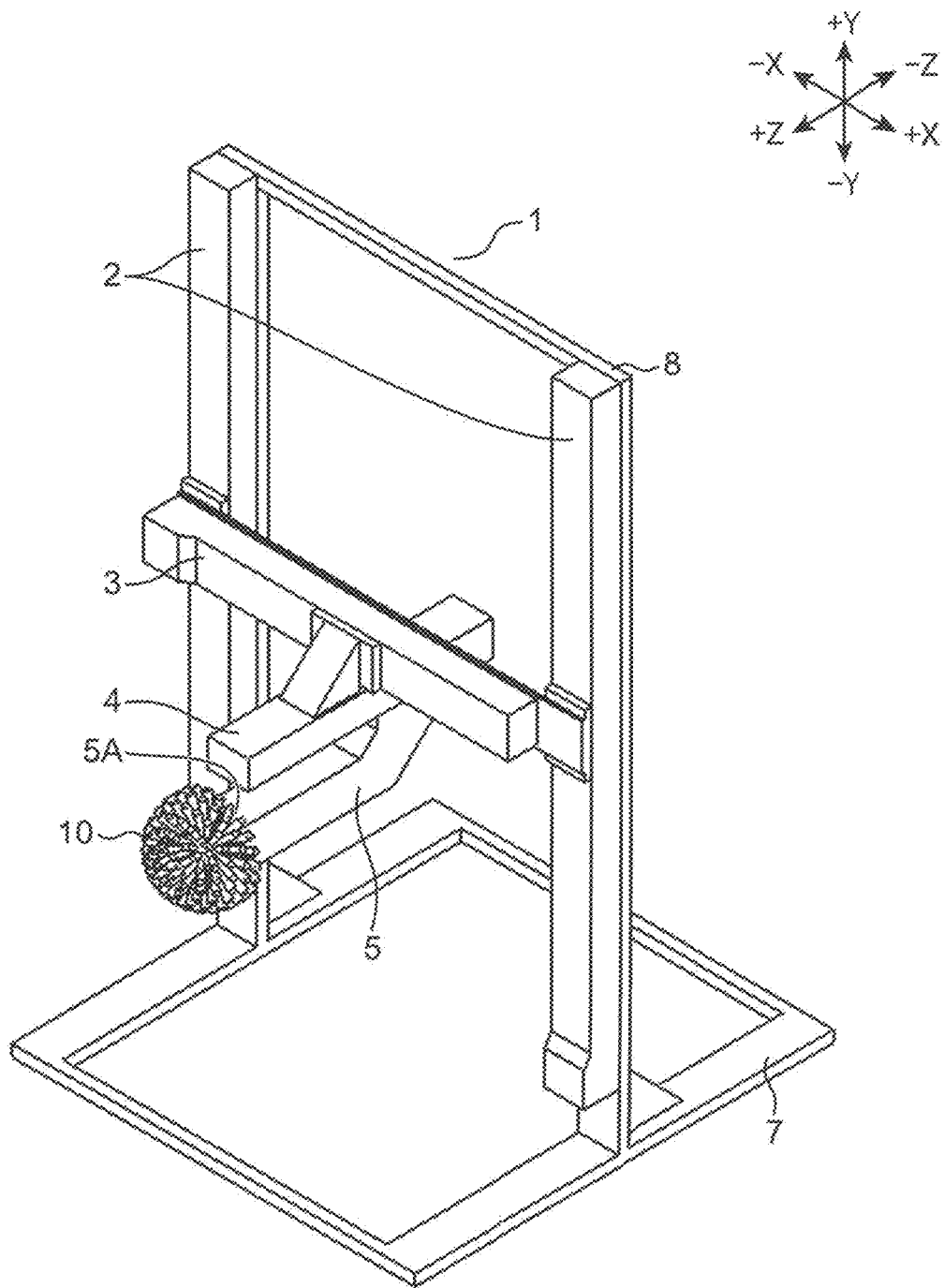
FIG. 6 illustrates an arm that has been slid to a rear end of the Z slider.
Figure 7:
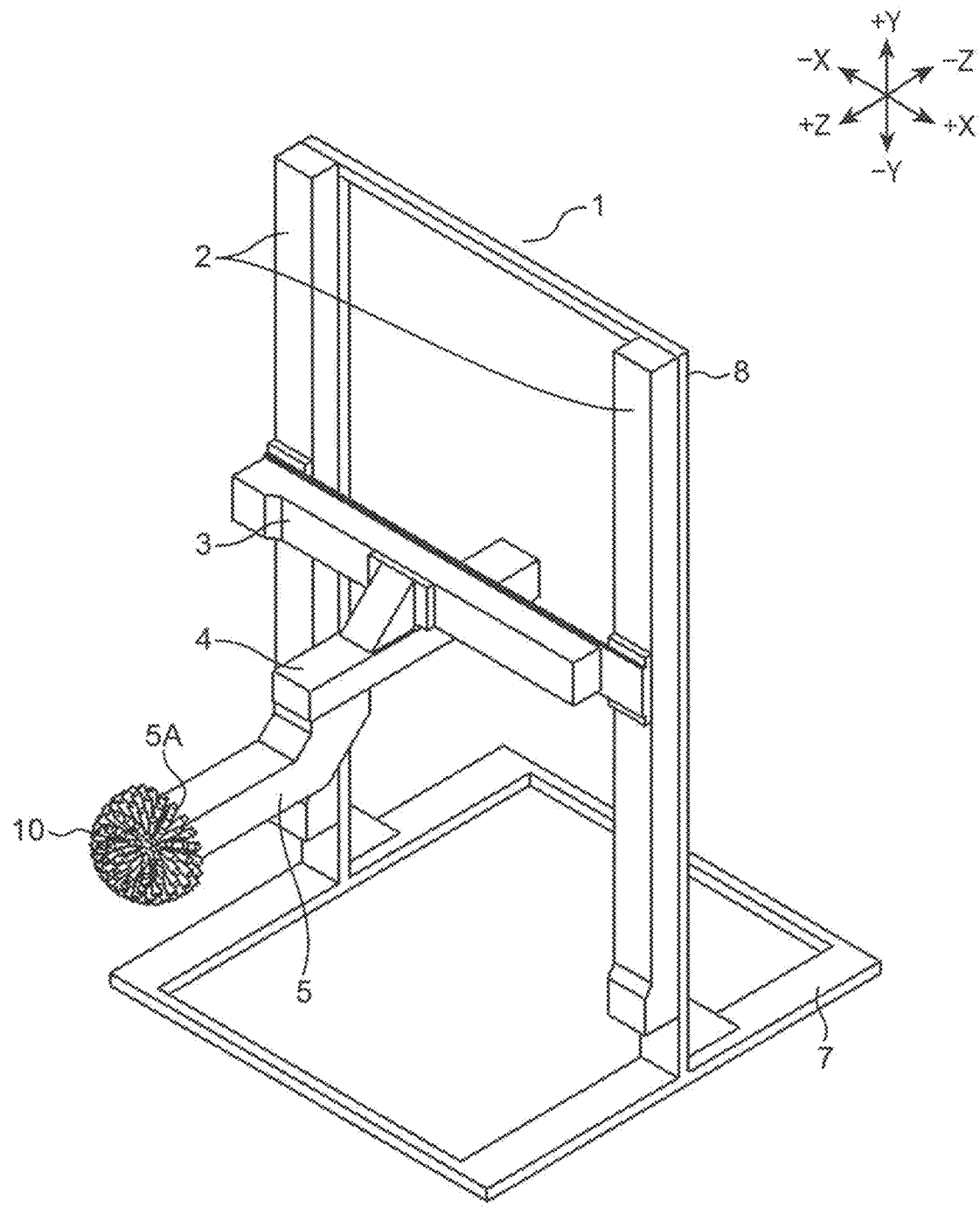
FIG. 7 illustrates the arm that has been slid to a front end of the Z slider.

FIG. 6 illustrates the arm 5 that has been slid to the rear end of the Z slider 4. FIG. 7 is the arm 5 that has been slid to the front end of the Z slider 4. As illustrated in FIGS. 6 and 7, the arm 5 can be positioned anywhere between the front end and the rear end of the Z slider 4. As described above, the arm 5 can be positioned anywhere under three degrees of freedom, that is, X direction, Y direction, and Z direction.

Figure 8:
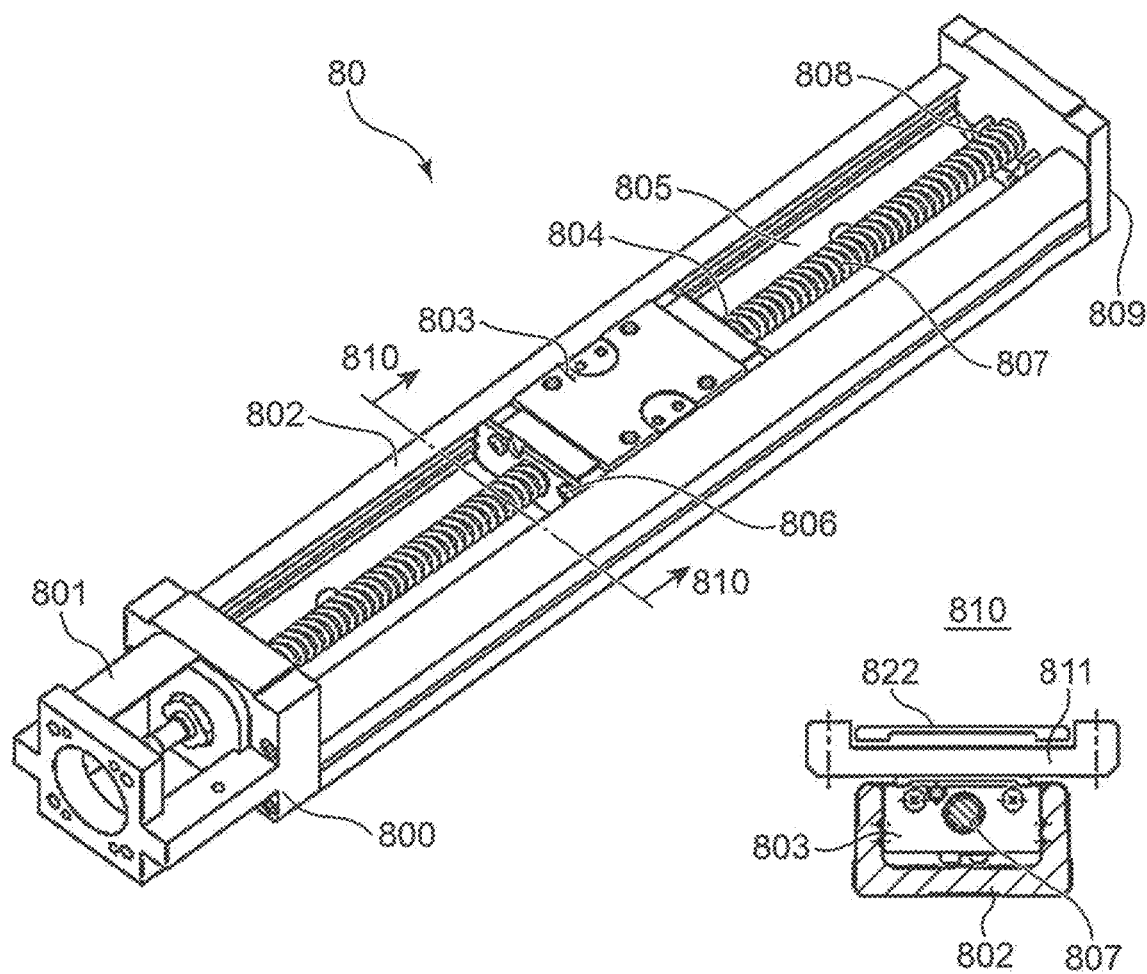
FIG. 8 illustrates an example of a configuration of a slide mechanism.

The X slider 3, a pair of the Y sliders 2, and the Z slider 4 each includes a slide mechanism 80 illustrated in FIG. 8. FIG. 8 illustrates an example of a configuration of the slide mechanism 80. In FIG. 8, the figure in the center illustrates a general configuration of the slide mechanism and the figure in the bottom right is a cross-sectional view of the slide mechanism 80 viewing in a direction 810.

The slide mechanism 80 includes a ball screw shaft 807 extending in a longitudinal direction of the slide mechanism 80, a slide block 803 screwed together with the ball screw shaft 807, a guide rail 805 that guides the slide block 803 along the longitudinal direction, and a dust cover 802 covering the guide rail 805. The slide mechanism 80 further includes a housing 809 attached to a first end of the dust cover 802, a motor bracket 800 attached to a second end of the dust cover 802, and a coupling cover 801 attached to the motor bracket 800. The ball screw shaft 807 has a thread groove on the surface, and is rotatably attached to an inner wall of the housing 809 and an inner wall of the motor bracket 800.

The slide block 803 has a shape almost like a rectangular solid and includes a pair of side seals 806 attached to both ends in the longitudinal direction. A hole which the ball screw shaft 807 runs through is provided in the middle of each of a pair of the side seals 806. Through the holes, the ball screw shaft 807 penetrates the slide block 803. A grease nipple 804 for supplying grease to the ball screw shaft 807 is attached to one of a pair of the side seals 806. A damper 808 is provided on the inner wall of the housing 809. The damper mitigates an impact on the housing 809 applied by the slide block 803 sliding toward the first end. A damper is also provided on the inner wall of the motor bracket 800 (not shown).

A motor (not shown) for rotating the ball screw shaft 807 is attached to the motor bracket 800. By the motor rotating in a first rotational direction, the ball screw shaft 807 rotates in the first rotational direction, and thereby the slide block 803 screwed together with the ball screw shaft 807 slides toward the first end along the longitudinal direction. By the motor rotating in a second rotational direction opposite the first rotational direction, the ball screw shaft 807 rotates in the second rotational direction, and thereby the slide block 803 screwed together with the ball screw shaft 807 slides toward the second end along the longitudinal direction.

As illustrated in the bottom right figure in FIG. 8, when viewed in the direction 810, the slide block 803 has a square shape and the ball screw shaft 807 penetrates the center of the square shape. When viewed in the direction 810, the dust cover 802 has a cross sectional shape covering the slide block 803 and opened to the upper side.

A sub-table 811 is attached to an upper face of the slide block 803. When viewed in the direction 810, the upper face of the sub-table 811 is recessed and an upper face cover 822 is attached over the recess. The sub-table 811 slides along the longitudinal direction together with the slide block 803.

For the slide mechanisms 80 constituting a pair of the Y sliders 2, end portions of the X slider 3 are attached to the sub-tables 811. For the slide mechanism 80 constituting the X slider 3, the holder 41 is attached to the sub-tables 811. For the slide mechanism 80 constituting the Z slider 4, a proximal end of the arm 5 is attached to the sub-tables 811.

The slide mechanism 80 illustrated in FIG. 8 is of a screw-type that slides the slide block 803 by the ball screw shaft 807, which is an example of the slide mechanism. The slide mechanism may be of a belt-type that slides the slide block 803 by an endless belt.

A pair of the Y sliders 2, the X slider 3, and the Z slider 4 each may be configured with a multi-stage slide mechanism including a multiple stages of the slide mechanisms 80 illustrated in FIG. 8. A multi-stage slide mechanism includes, for example, a first slide mechanism and a second slide mechanism. The first slide mechanism and the second slide mechanism are each provided as the slide mechanism illustrated in FIG. 8.

The second slide mechanism is attached to the sub-table 811 of the first slide mechanism. For example, when the slide block 803 of the first slide mechanism slides toward the +X direction, the second slide mechanism also slides toward the +X direction in conjunction with the sliding of the first slide mechanism. For example, when the slide block 803 of the first slide mechanism has slid to the farthest allowable position toward the +X direction, then, the slide block 803 of the second slide mechanism starts to slide toward the +X direction. Using the multi-stage slide mechanism, the arm 5 can have a larger movable range while keeping the size of the cleaning robot 1 small.

One of the first slide mechanism and the second slide mechanism may be a belt-type slide mechanism and the other one a screw-type slide mechanism.

The arm 5 will now be described. The arm 5 of the embodiment has a first aspect, in which the orientation of the distal end portion of the arm 5 is changed by a sliding member, and a second aspect, in which the orientation of the distal end portion of the arm 5 is changed without using the sliding member. The arm 5 according to the first aspect will be described.

Figure 10:
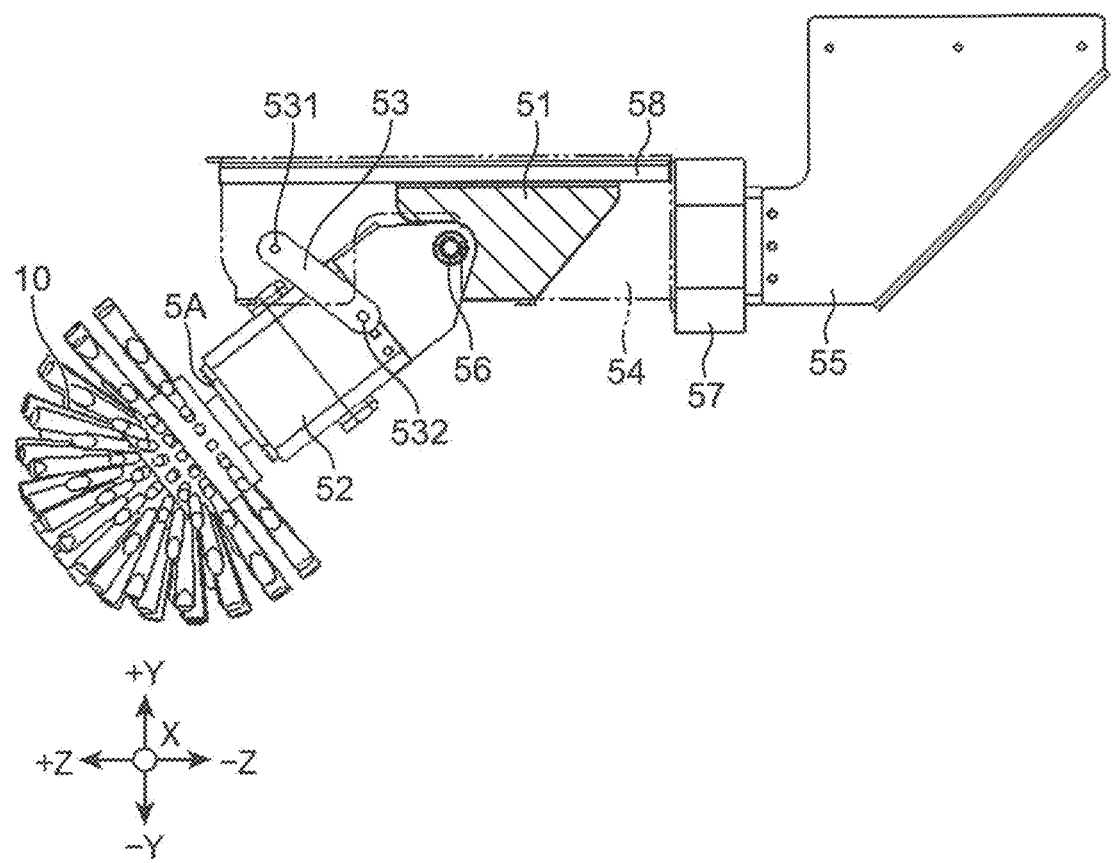
FIG. 10 is an X directional view of the arm according to the first aspect.
Figure 11:
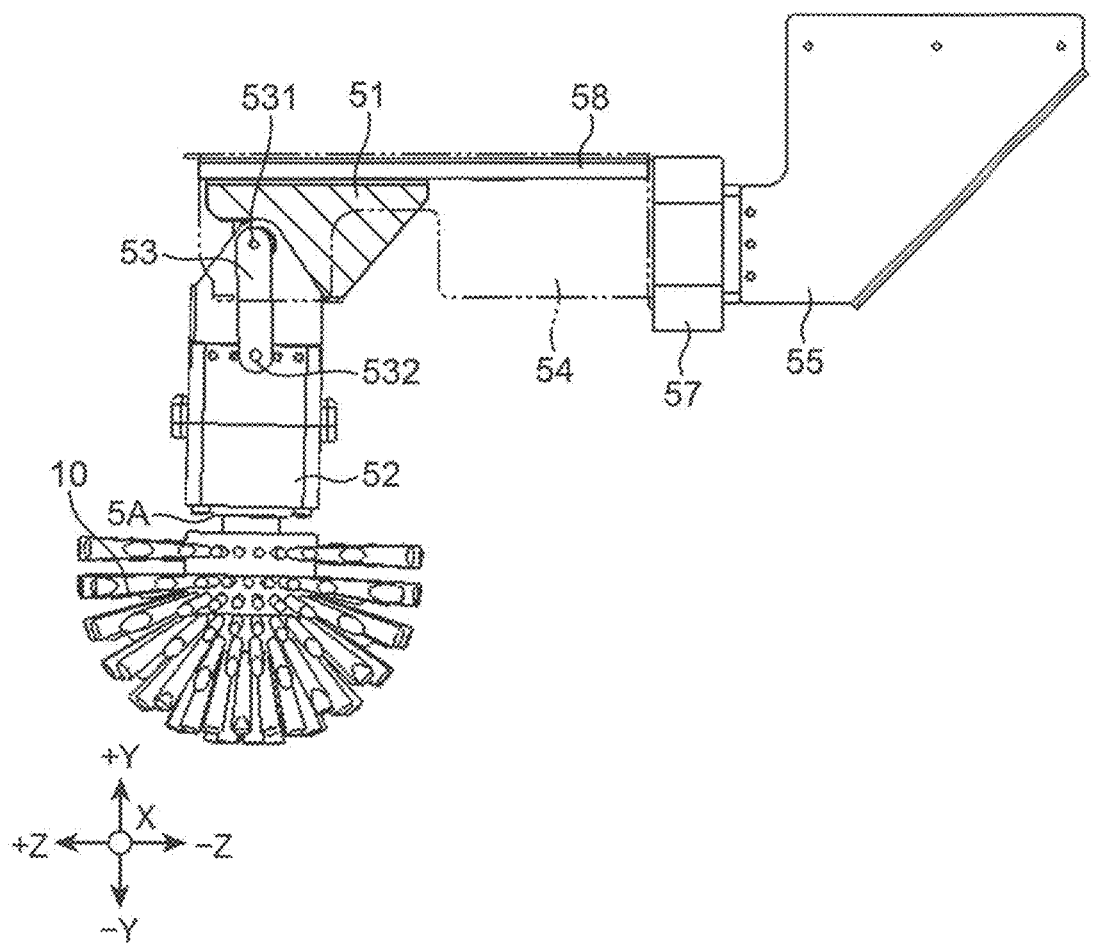
FIG. 11 is an X directional view of the arm according to the first aspect.

FIGS. 9 to 11 illustrate the arm 5 according to the first aspect in an X directional view. FIG. 9 illustrates the arm 5 with the distal end portion 5A oriented toward the +Z direction. FIG. 10 illustrates the arm 5 with the distal end portion 5A oriented toward the lower left, diagonal to Z direction. FIG. 11 illustrates the arm 5 with the distal end portion 5A oriented toward the −Y direction.

The arm 5 according to the first aspect includes a rail 58 extending in Z direction, a sliding member 51 slidably attached to the rail 58, a second member 52 that has the distal end portion 5A to which the brush 10 is detachably attached and is rotatably attached to the sliding member 51 to rotate about an X axis, and a pair of links 53 provided on both sides, regarding X direction, and opened toward the −Y direction. The arm 5 also includes a first member 54 that is illustrated in dotted lines and serves as a housing that houses the rail 58, the second member 52, the sliding member 51, and a pair of the links 53.

In a Z directional view, the first member 54 has a C-shape having a ceiling in the side toward the +Y direction and a pair of side faces on both sides regarding X direction. The rail 58 is attached to an inner wall of the ceiling of the first member 54.

A joint portion 56 is provided in a proximal end of the second member 52. The joint portion 56 pivotally connects the second member 52 to the sliding member 51 to pivot about the X axis. The joint portion 56 is an example of a joint provided in the arm 5.

A first joint portion 531 and a second joint portion 532 are attached to both ends of the link 53. The link 53 is pivotally attached to an inner wall of the side face of the first member 54 at the first joint portion 531. The link 53 is pivotally attached to the side face of the sliding member 51 at the second joint portion 532.

The arm 5 according to the first aspect further includes a coupling 57 connected to the proximal end of the first member 54, and a third member 55 connected to the coupling 57. A first end of the third member 55 is connected to the coupling 57. A second end of the third member 55 is attached to a lower face of the Z slider 4 (see FIG. 1).

An arm motor M5 (see FIG. 25) for sliding the sliding member 51 toward the +Z direction and the −Z direction is provided inside the first member 54. When the sliding member 51 is slid toward the +Z direction by the arm motor M5, the second member 52 is pushed toward the +Z direction by the sliding member 51. During this motion, the link 53 attached to the inner wall of the side face of the first member 54 via the first joint portion 531 restricts the second member 52 moving toward the +Z direction. As illustrated in FIG. 10, as the sliding member 51 slides toward the +Z direction, the second member 52 gradually tilts about the joint portion 56 so as the distal end portion 5A to be oriented toward the −Y direction.

As illustrated in FIG. 11, when the sliding member 51 reaches the leading end in the +Z direction of the first member 54, the link 53 is longitudinally oriented along Y direction and the second member 52 is positioned with the distal end portion 5A oriented toward the −Y direction.

In the state illustrated in FIG. 11, when the sliding member 51 is slid toward the −Z direction by the arm motor M5, the link 53 causes the second member 52 to rise so as the distal end portion 5A to be oriented toward the +Z direction. The state returns to the state as illustrated in FIG. 10 and then to the state as illustrated in FIG. 9.

As described above, the arm 5 according to the first aspect switches the orientation of the distal end portion 5A by the sliding member 51, so that the total length of the arm 5 can be kept approximately to the total length of the first member 54. This keeps the size of the cleaning robot 1 small.

Figure 12:
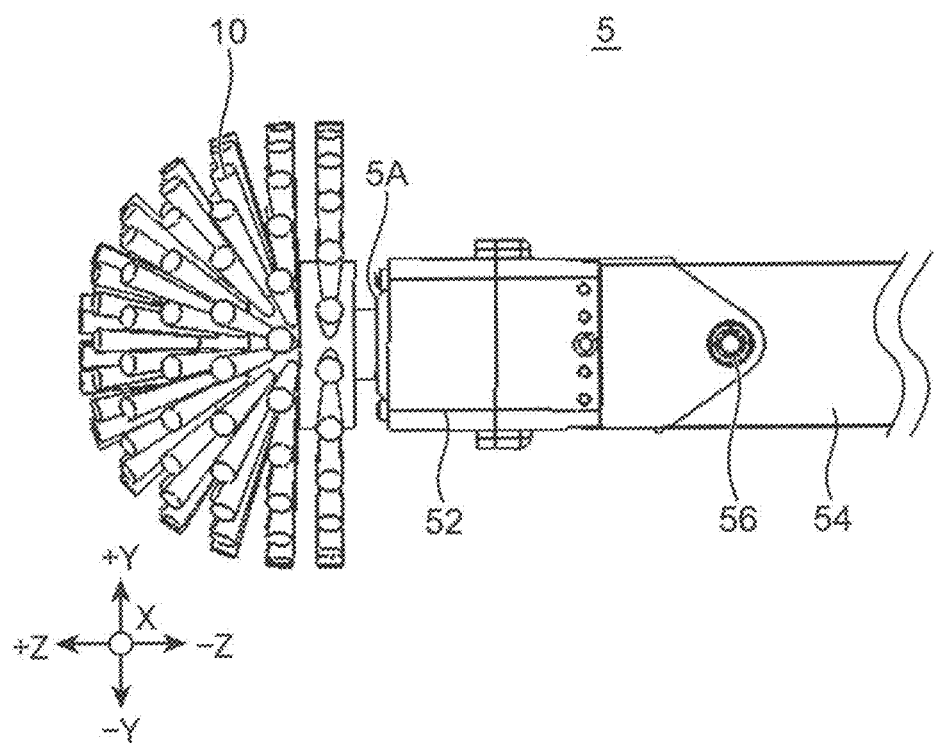
FIG. 12 is an X directional view of the arm according to a second aspect.
Figure 13:
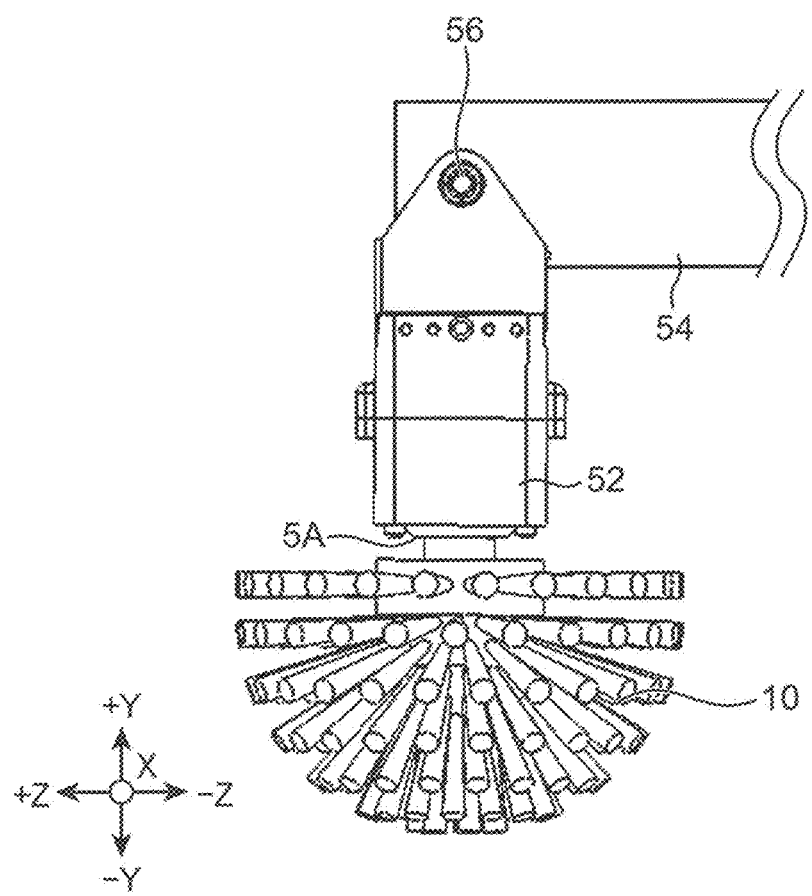
FIG. 13 is an X directional view of the arm according to the second aspect.

FIGS. 12 and 13 illustrate the arm 5 according to the second aspect in an X directional view. FIG. 12 illustrates the arm 5 with the distal end portion 5A oriented toward the +Z direction. FIG. 13 illustrates the arm 5 with the distal end portion 5A oriented toward the −Y direction.

The arm 5 according to the second aspect includes a first member 54 extending in Z direction, and a second member 52 that has a distal end portion 5A to which the brush 10 is detachably attached and is rotatably attached to the first member 54 to rotate about the X axis. A joint portion 56 is provided in a proximal end of the second member 52. The joint portion 56 pivotally connects the second member 52 to the first member 54 to pivot about the X axis. The joint portion 56 is an example of a joint provided in the arm 5.

An arm motor M5 (see FIG. 25) that rotates the second member 52 is provided inside the first member 54. In the state illustrated in FIG. 12, when the arm motor M5 rotates in a first rotational direction, the second member 52 rotates via the joint portion 56 to orient the distal end portion 5A toward the −Y direction. This changes the position of the arm 5 from the state illustrated in FIG. 12 to the state illustrated in FIG. 13. In the state illustrated in FIG. 13, when the arm motor M5 rotates in a second rotational direction opposite the first rotational direction, the second member 52 rotates via the joint portion 56 to orient the distal end portion 5A toward the +Z direction. This changes the position of the arm 5 from the state illustrated in FIG. 13 to the state illustrated in FIG. 12.

Figure 14:
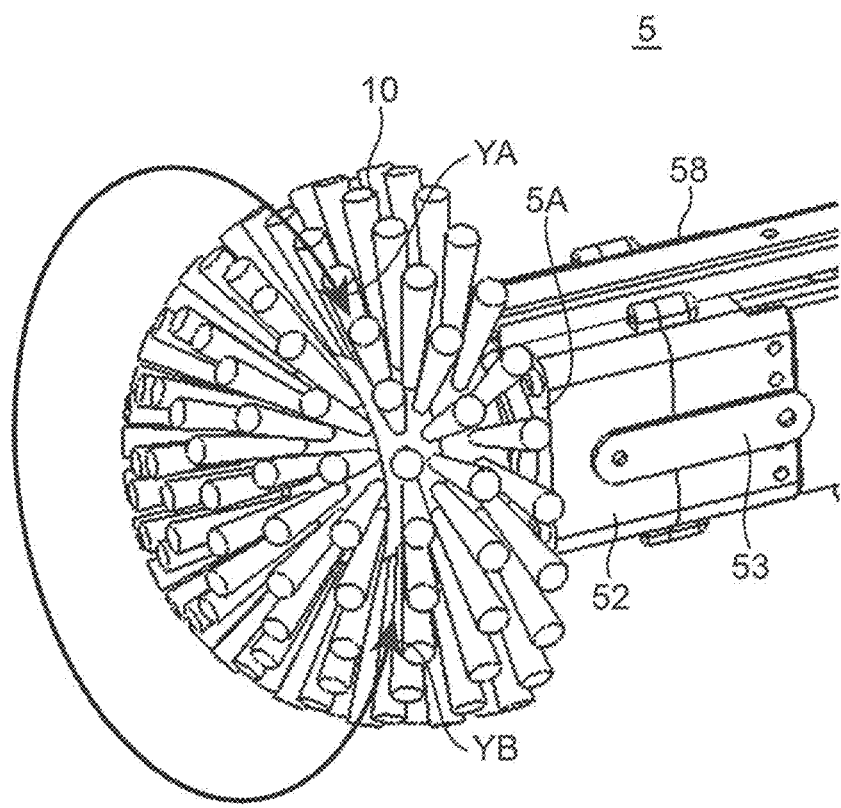
FIG. 14 is a figure for explaining a rotation of a brush.
Figure 15:
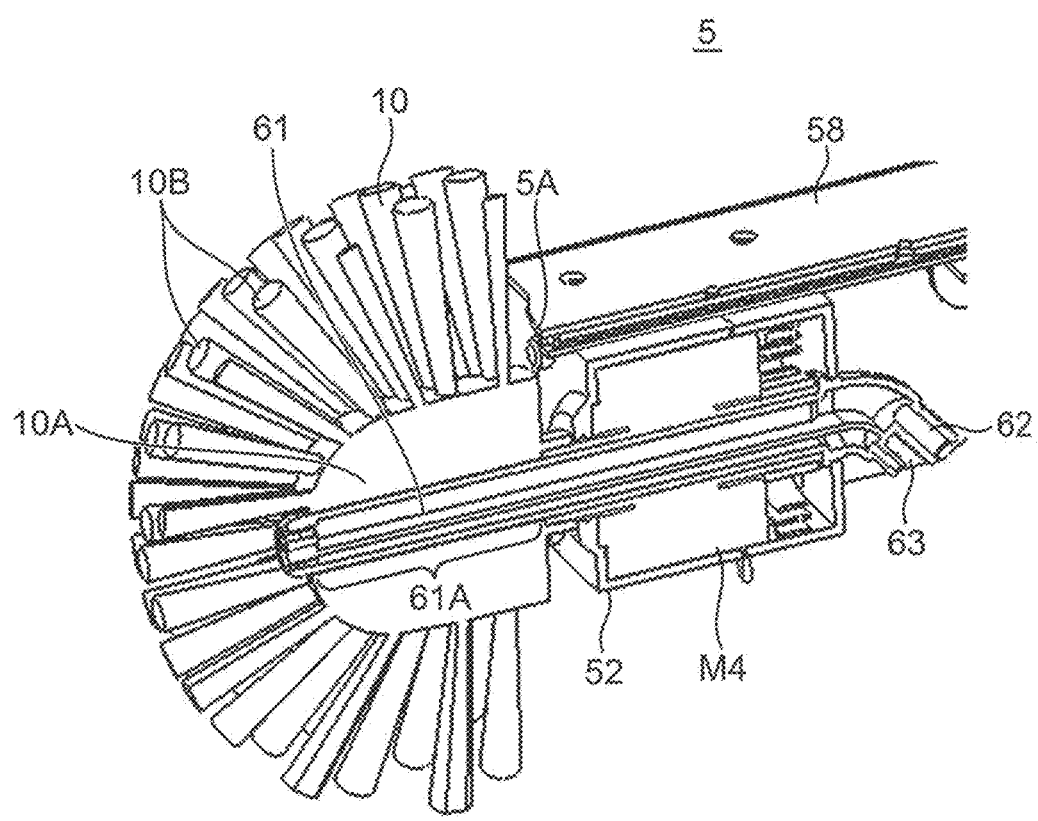
FIG. 15 is a cross-sectional view of the brush and the arm.

The operation of the brush 10 will now be described. FIG. 14 is a figure for explaining a rotation of the brush 10. FIG. 15 is a cross-sectional view of the brush 10 and the arm 5. As illustrated in FIG. 15, the second member 52 has inside a nozzle 61 for discharging water or a cleanser. A portion of the nozzle 61 intrudes into the inside of the second member 52. The nozzle 61 includes a projecting portion 61A that projects out of the distal end portion 5A. A cleanser supply line 62 for supplying the cleanser and a water supply line 63 for supplying water are connected to a proximal end of the nozzle 61. For example, a cleanser called microbubble which can automatically remove a stain.

The brush 10 includes a brush body 10A, and a plurality of raised portions 10B radially extending from the brush body 10A. The brush body 10A has in its center a hollow in which the projecting portion 61A is inserted. With the projecting portion 61A inserted in the hollow of the brush body 10A, the distal end of the nozzle 61 is exposed out from the brush body 10A. The cleanser or water is discharged from the distal end of the front portion of the brush 10 through the nozzle 61.

A brush motor M4 that rotates the brush 10 is provided inside the second member 52. The brush motor M4 is a hollow shaft motor that has in its center a hollow which the nozzle 61 penetrates.

By the brush motor M4 rotating in a first rotational direction, the brush 10 rotates clockwise in a front view as indicated by an arrow YA in FIG. 14. By the brush motor M4 rotating in a second rotational direction opposite the first rotational direction, the brush 10 rotates counterclockwise in a front view as indicated by an arrow YB in FIG. 14.

Figure 16:
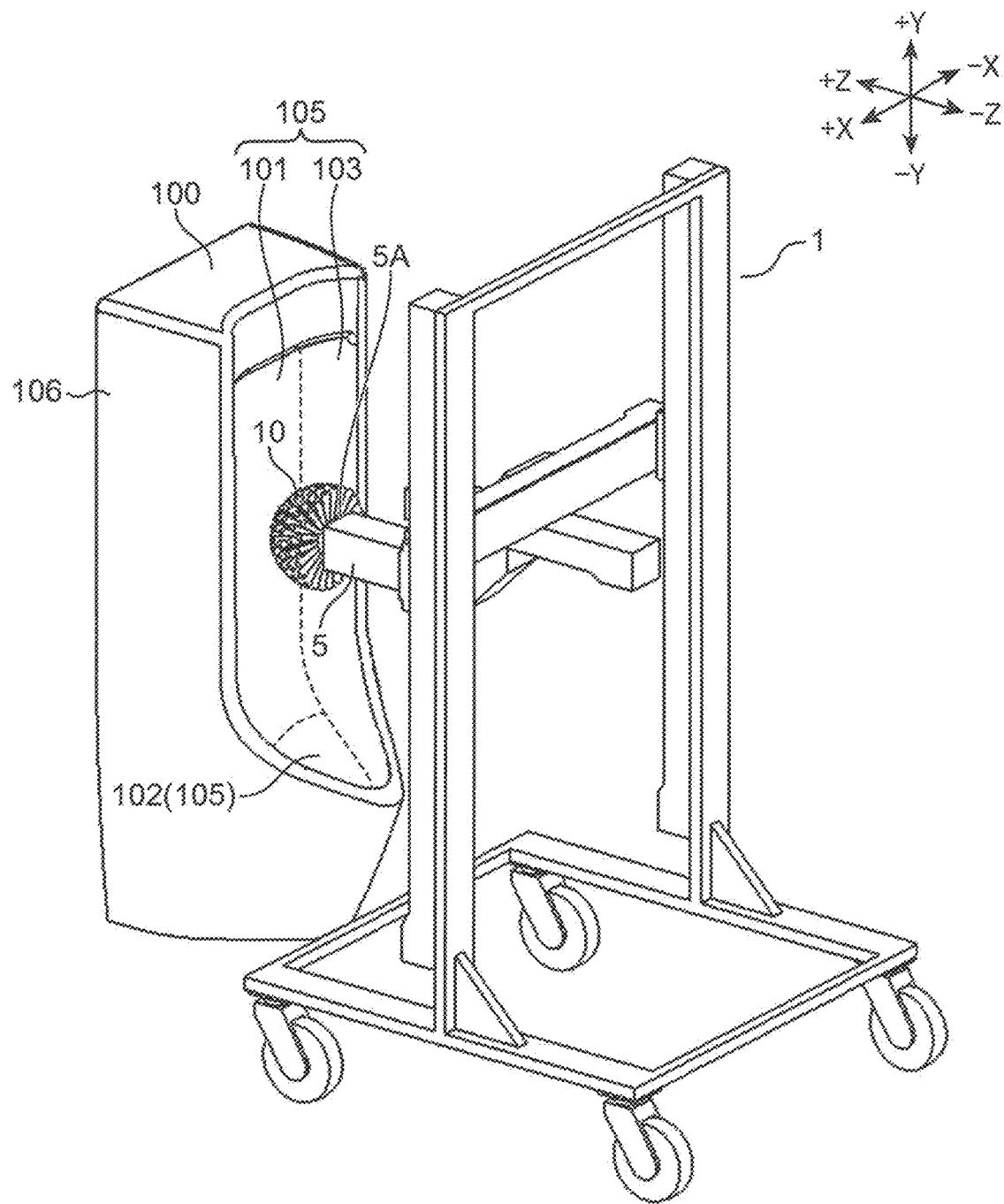
FIG. 16 illustrates a distal end portion of the arm oriented toward a +X direction.
Figure 17:
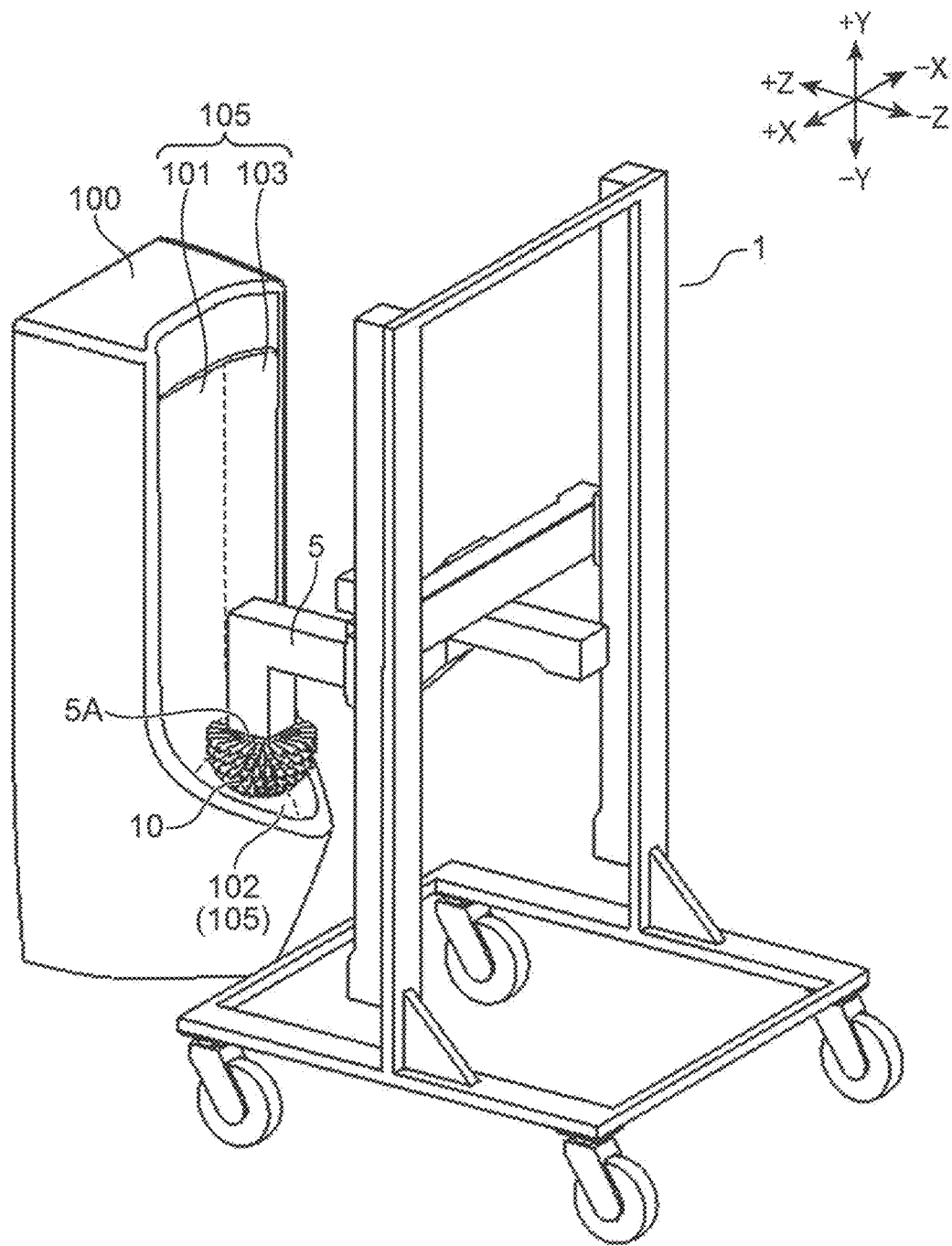
FIG. 17 illustrates the distal end portion of the arm oriented toward a −Y direction.

A state in which the cleaning robot 1 faces the toilet 100 will now be described. FIG. 16 illustrates the distal end portion 5A of the arm 5 oriented toward the +X direction. FIG. 17 illustrates the distal end portion 5A of the arm 5 oriented toward the −Y direction.

As illustrated in FIG. 16, the toilet 100 includes an outer face 106 in the outer side and an inner face 105 in the inner side. The inner face 105 includes a front face 101, a bottom face 102, a right side face 103, and a left side face 104 (not shown). The cleaning robot 1 facing the toilet 100 faces the front face 101 in the +Z direction. The front face 101 is an example of a first target face. The cleaning robot 1 facing the toilet 100 faces the bottom face 102 in the −Y direction. The bottom face 102 is an example of a second target face. The cleaning robot 1 facing the toilet 100 faces the right side face 103 in the −X direction. The right side face 103 is an example of a third target face. The cleaning robot 1 facing the toilet 100 faces the left side face 104 in the +X direction. The left side face 104 is an example of the third target face. To face a target face in a certain direction means to oppose the target face in the certain direction. The target face may be normal to the certain direction or the target face may tilt against the certain direction by, for example, about 0 to 45 degrees. A plurality of faces constituting the inner face 105 each may be a plane face or a curved face.

As illustrated in FIG. 16, when the arm 5 cleans the front face 101, the distal end portion 5A faces the front face 101. When the distal end portion 5A faces the front face 101, the front portion of the brush 10 faces the front face 101 of the toilet 100. As illustrated in FIG. 17, when the arm 5 cleans the bottom face 102, the distal end portion 5A faces the bottom face 102. When the distal end portion 5A faces the bottom face 102, the front portion of the brush 10 faces the bottom face 102 of the toilet 100. Accordingly, the front portion of the brush 10 can contact the front face 101 of the toilet 100 when cleaning the front face 101, and the front portion of the brush 10 can contact the bottom face 102 of the toilet 100 when cleaning the bottom face 102. This enables the brush 10 to contact the target face with a suitable force, and thereby a stain can surely be cleaned off.

Figure 18:
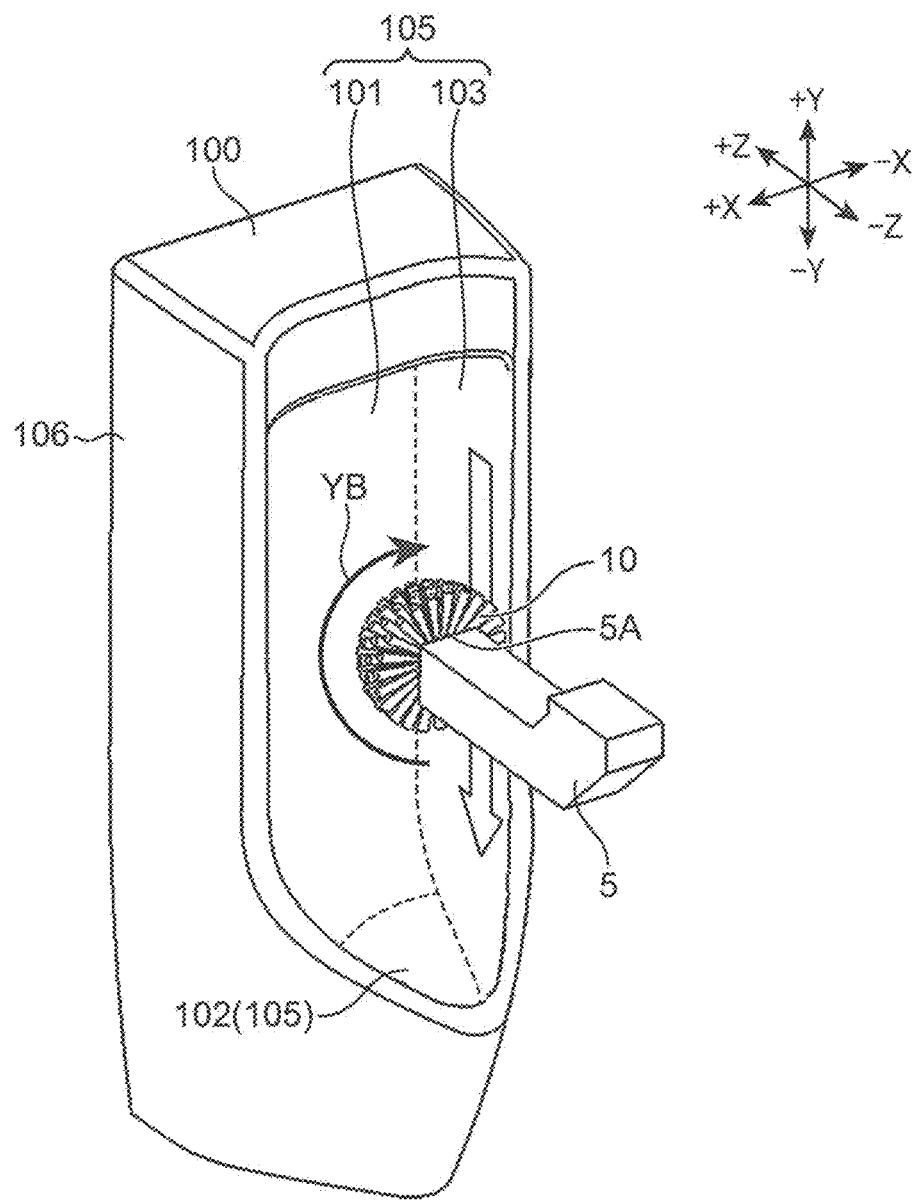
FIG. 18 is a figure for explaining the brush operated to clean a right side face.

FIG. 18 is a figure for explaining the brush 10 operating to clean the right side face 103. When cleaning the right side face 103, the distal end portion 5A of the arm 5 faces the front face 101. With the side portion of the brush 10 in contact with the right side face 103, the arm 5 slides toward the −Y direction, for example. During this motion, the brush 10 rotates in the direction indicated by the arrow YB. As a result, the rotation direction of the brush 10 on the right side surface 103 faces the −Y direction, which is the same direction as the direction toward which the arm 5 slides, so that spattering of liquid is suppressed. This allows the arm 5 to smoothly slide toward the −Y direction. Although the arm 5 slides toward the −Y direction in the example in FIG. 18, the arm 5 may slide toward the +Y direction. In this case, in order to make the rotation direction of the brush 10 on the right side surface 103 and the sliding direction of the arm 5 the same direction, the rotation direction of the brush 10 may be opposite to the arrow YB.

Figure 19:
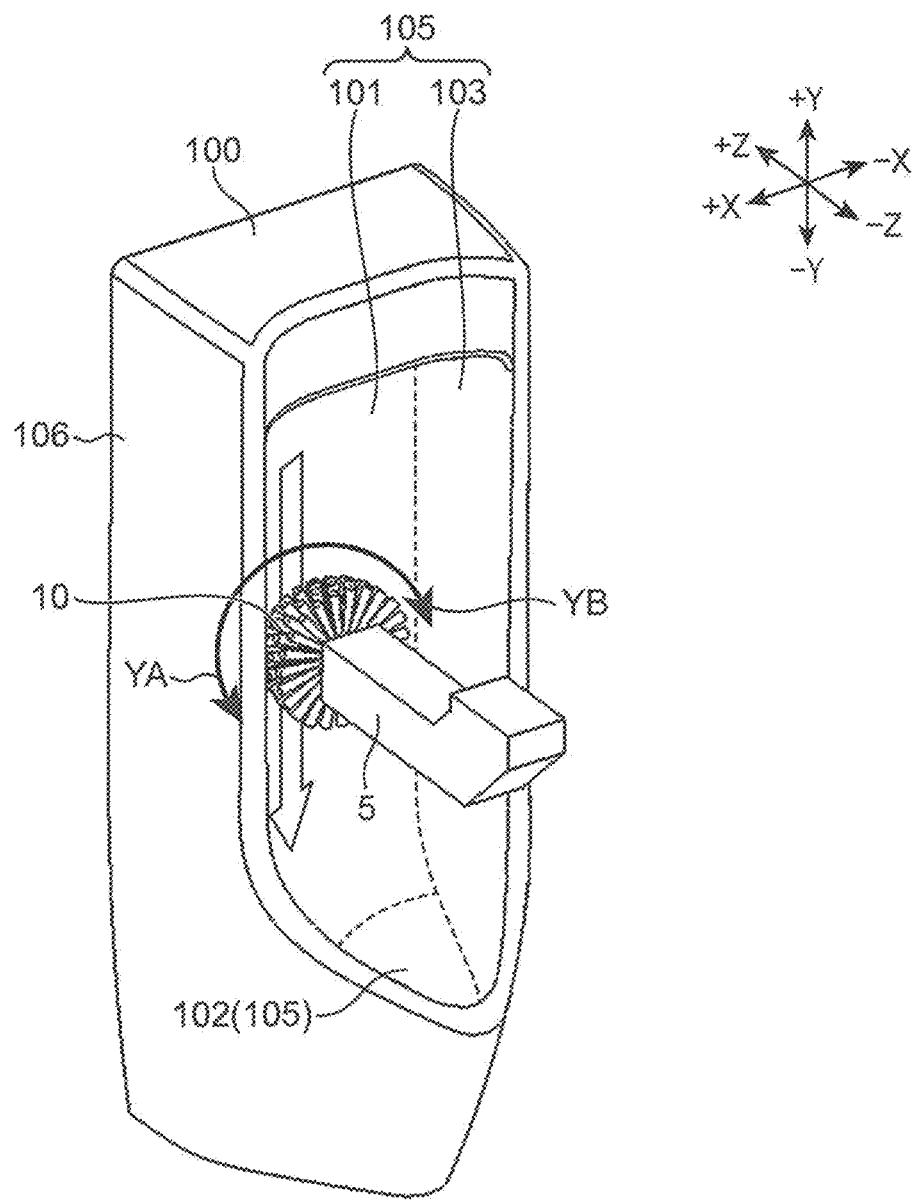
FIG. 19 is a figure for explaining the brush operated to clean a front face.

FIG. 19 is a figure for explaining the brush 10 operating to clean the front face 101. When cleaning the front face 101, the distal end portion 5A of the arm 5 faces the front face 101. With the distal end of the brush 10 in contact with the front face 101, the arm 5 slides toward the −Y direction, for example. During this motion, the brush 10 rotates alternately in the direction indicated by the arrow YA and the direction indicated by the arrow YB. The alternate rotation of the brush 10 is hereinafter referred to as "vibration". This increases the polishing power of the brush 10 acting on the toilet 100, and further surely cleans off a stain on the toilet 100. Furthermore, since a high polishing power can be provided even with a small vibrational amplitude, which is the rotational angle of the vibrating brush 10, spattering of liquid from the brush 10 and the toilet 100 can be suppressed when the vibrating brush 10 is used. A suitable vibrational amplitude, such as 5, 10, 30, 45, and 90 degrees, may be used.

The arm 5 sliding toward the −Y direction in FIG. 19 is an example. The arm 5 may slide toward the +Y direction, the +X direction, or the −X direction.

Figure 20:
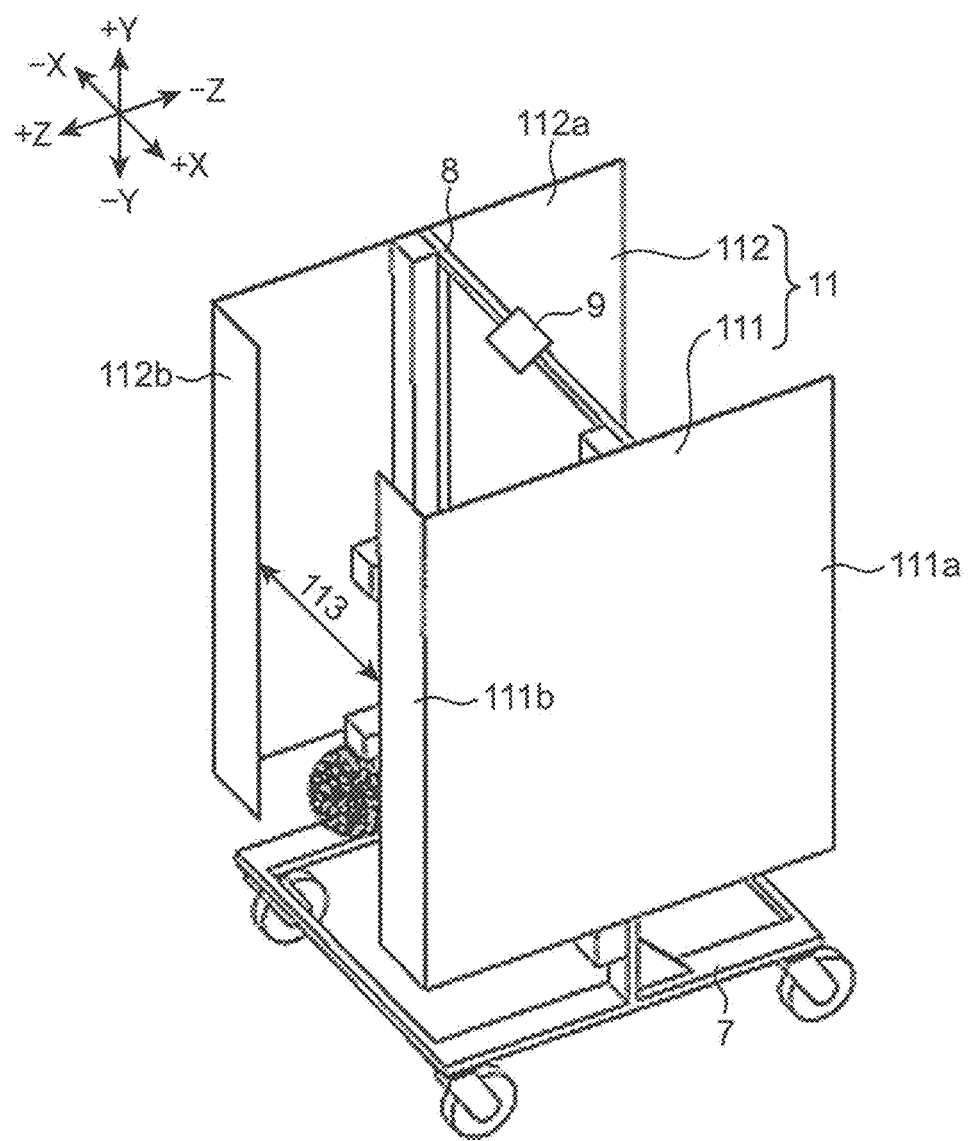
FIG. 20 is a figure for explaining a cover attached to the cleaning robot.

FIG. 20 is a figure for explaining the cover 11 attached to the cleaning robot 1. As illustrated in FIG. 20, the cleaning robot 1 may further include the cover 11. The cover 11 includes a left cover 111 provided in the +X direction side and a right cover 112 provided in the −X direction side.

Each of the left cover 111 and the right cover 112 has a line-symmetric shape respect to the Z direction. Each of the left cover 111 and the right cover 112 includes a side face 111a and a side face 112a normal to X direction. Each of the left cover 111 and the right cover 112 includes a front face 111b and a front face 112b provided in the +Z direction side and normal to Z direction. The side faces 111a and 112a each has a square shape that almost covers the entire region of the cleaning robot 1 regarding Y direction and Z direction. A gap 113 is provided between the front face 111b and the front face 112b. The cover 11 is slidably attached to the vertical frame 8 to move along Z direction. The gap 113 has approximately the same width as the Z directional width of the toilet 100.

Figure 21:
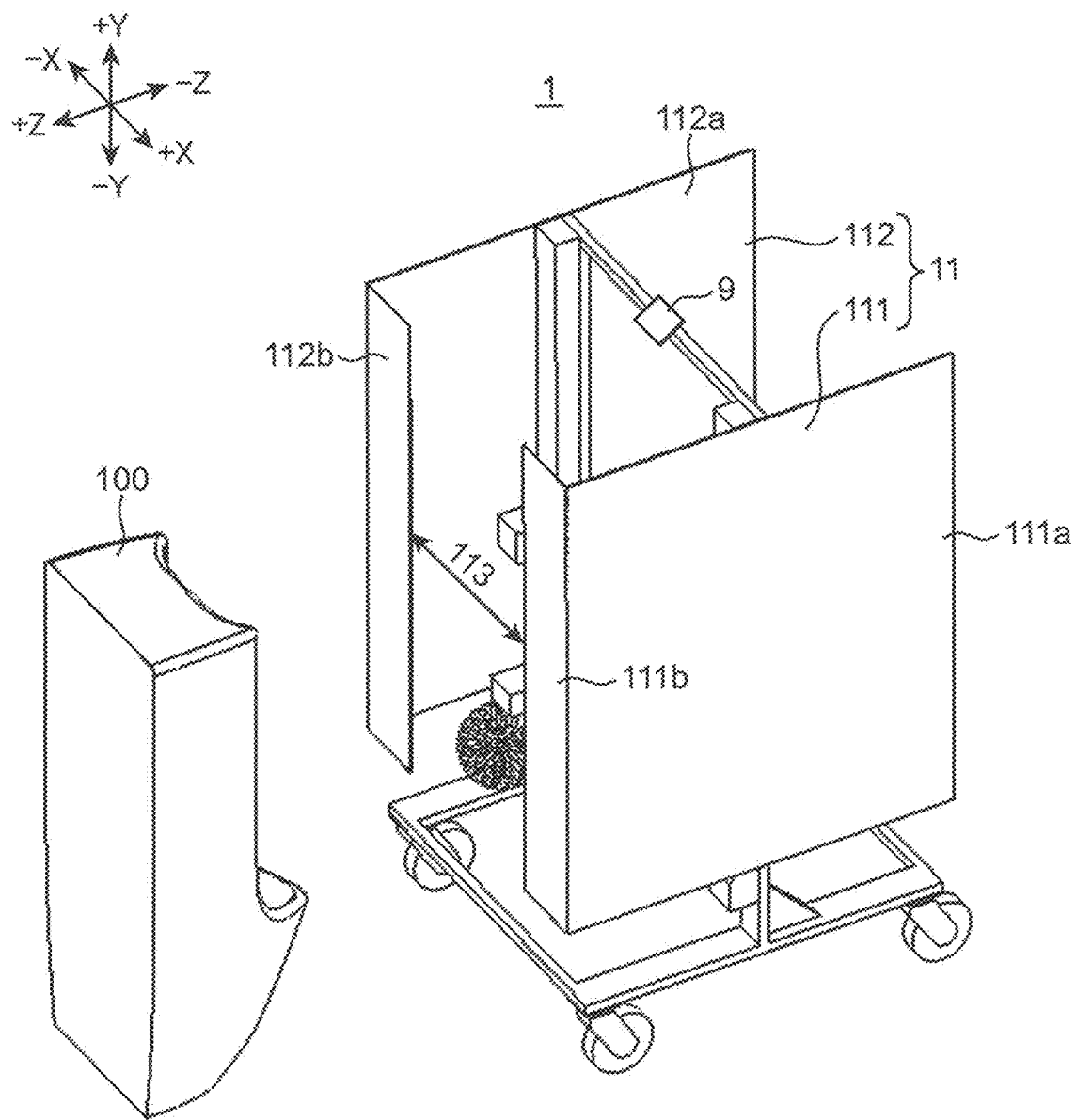
FIG. 21 is a figure for explaining sliding of the cover.
Figure 22:
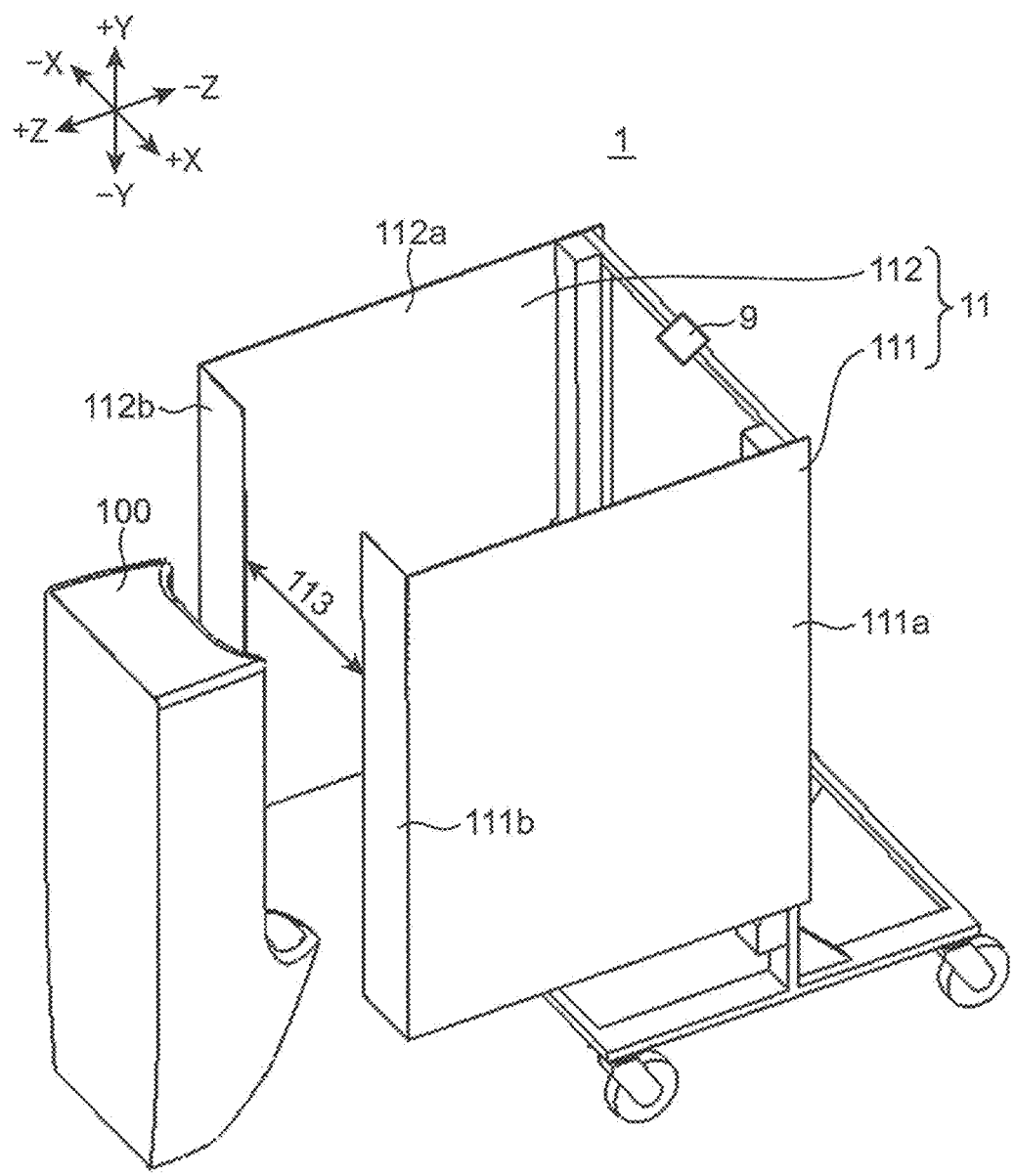
FIG. 22 is a figure for explaining sliding of the cover.
Figure 23:
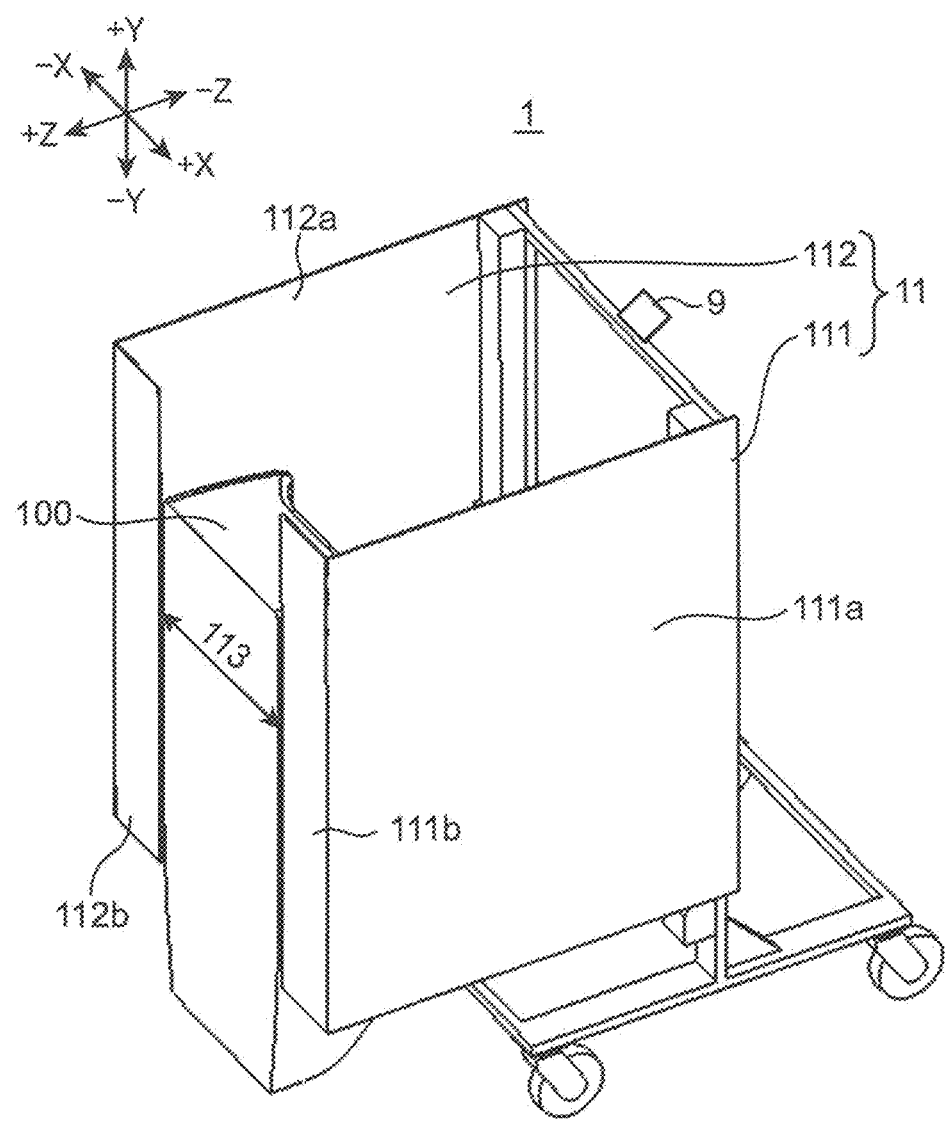
FIG. 23 is a figure for explaining sliding of the cover.

FIGS. 21 to 23 are figures for explaining sliding of the cover 11. In FIG. 21, the cleaning robot 1 faces the front face 101 of the toilet 100 with a predetermined distance therebetween. In FIG. 22, the cover 11 has been slid toward the +Z direction by a maximum distance. In FIG. 23, the cleaning robot 1 with the cover 11 slid toward the +Z direction by the maximum distance is moved forward toward the +Z direction. The cleaning robot 1 accommodates the toilet 100 in the cover 11 through the gap 113, and can move in the +Z direction to a position where the front surfaces 111b and 112b are continuous with the back surface of the toilet 100. As a result, the cleaning robot 1 can cover the whole toilet 100. Even when a liquid spatters during cleaning, the cover 11 shields flying liquid droplets, thereby it is possible to prevent the dirty liquid from splashing around the toilet 100. Furthermore, the cover 11 shielding the flying droplets of dirty liquid lowers the possibility of the dirty liquid hitting a person who is passing his urine into a toilet 100 next to the toilet 100. As a result, the toilet 100 can be cleaned without keeping the other toilet 100 in the public lavatory unavailable.

Figure 24:
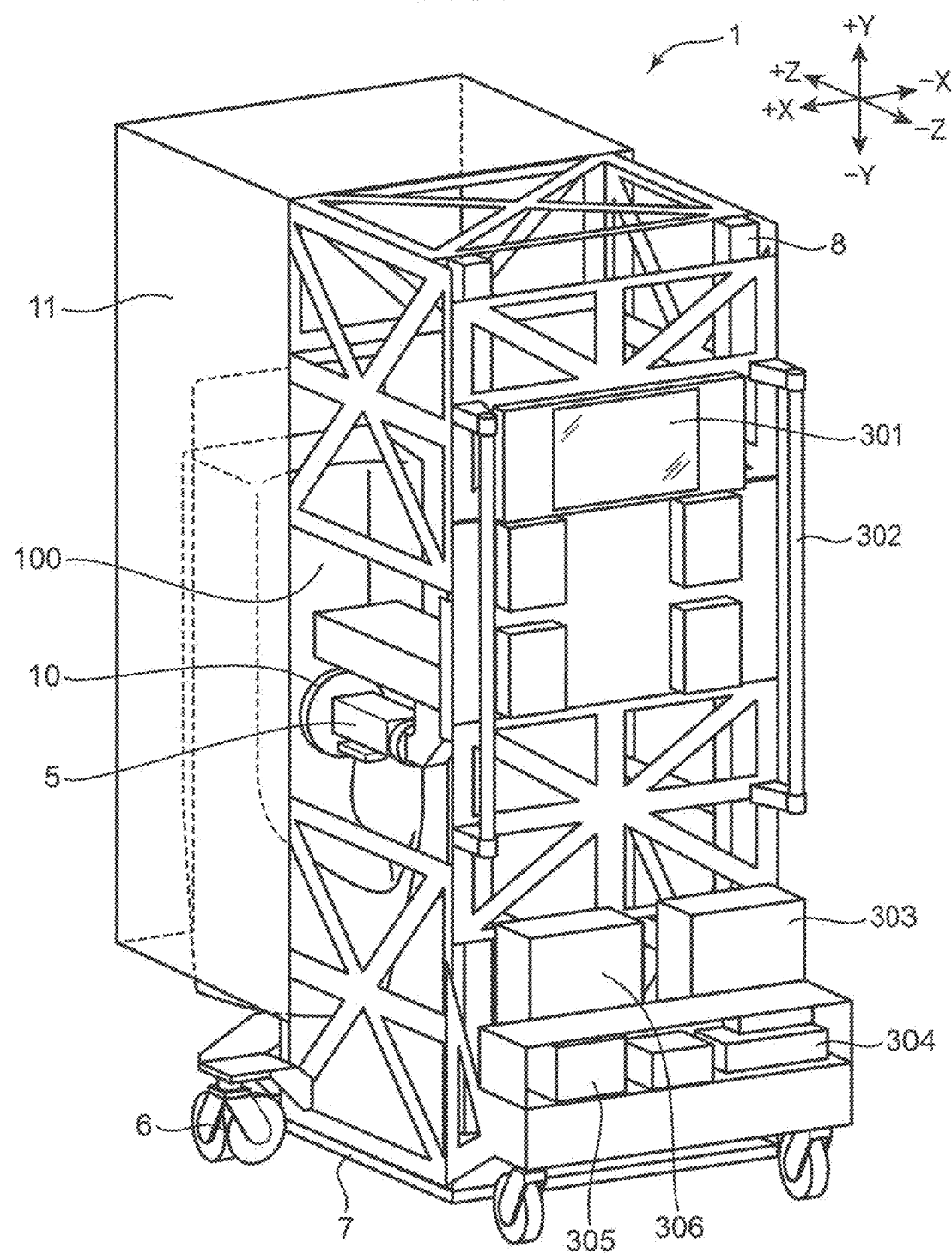
FIG. 24 is a further detailed external view illustrating the cleaning robot according to the disclosure.

FIG. 24 is a further detailed external view illustrating the cleaning robot 1 according to the disclosure. As illustrated in FIG. 24, the cleaning robot 1 includes the arm 5, the casters 6, the horizontal frame 7, and the vertical frame 8 illustrated in FIG. 1 and the cover 11 illustrated in FIG. 20. In addition, the cleaning robot 1 includes a touch panel 301, a pair of handrails 302, a water tank 303, a cleanser tank 306, a DC/AC inverter unit 304, and a battery 305.

The touch panel 301 is provided on an upper portion of the back face of the vertical frame 8. The touch panel 301 presents a manipulation screen through which a user inputs settings to the cleaning robot 1 and a notice screen for noticing the state of the cleaning robot 1.

A pair of the handrails 302 have a shape of extending in Y direction and is attached to an approximately middle portion of the back face of the vertical frame 8. A pair of the handrails 302 is held by a cleaning person when, for example, the cleaning person moves the cleaning robot 1.

The water tank 303 is attached to the back face of the vertical frame 8 and below a pair of the handrails 302. The water tank 303 stores water used for cleaning the toilet 100. The water stored in the water tank 303 is pumped out by a water pump (not shown) and discharged from the distal end of the brush 10 through the water supply line 63 and the nozzle 61 toward the toilet 100.

The cleanser tank 306 is provided behind the back face of the vertical frame 8 and next to the water tank 303. The cleanser tank 306 stores a cleanser used for cleaning the toilet 100.

The DC/AC inverter unit 304 is provided below the water tank 303 behind the back face of the vertical frame 8. The DC/AC inverter unit 304 includes a plurality of DC/AC inverters for various motors included in the cleaning robot 1. The DC/AC inverter unit 304 converts a DC power stored in the battery 305 into an AC power and supplies the AC power to the various motors of the cleaning robot 1.

The battery 305 is, for example, a secondary battery such as a lithium ion battery that stores power as a power source of the cleaning robot 1. In the example illustrated in FIG. 24, the cover 11 has a ceiling face in addition to the configuration illustrated in FIG. 20.

The caster 6 has a locking function. The casters 6 are locked by, for example, a cleaning person when the cleaning robot 1 cleans the toilet 100. It is possible to prevent the cleaning robot 1 from moving unintentionally during cleaning.

Figure 25:
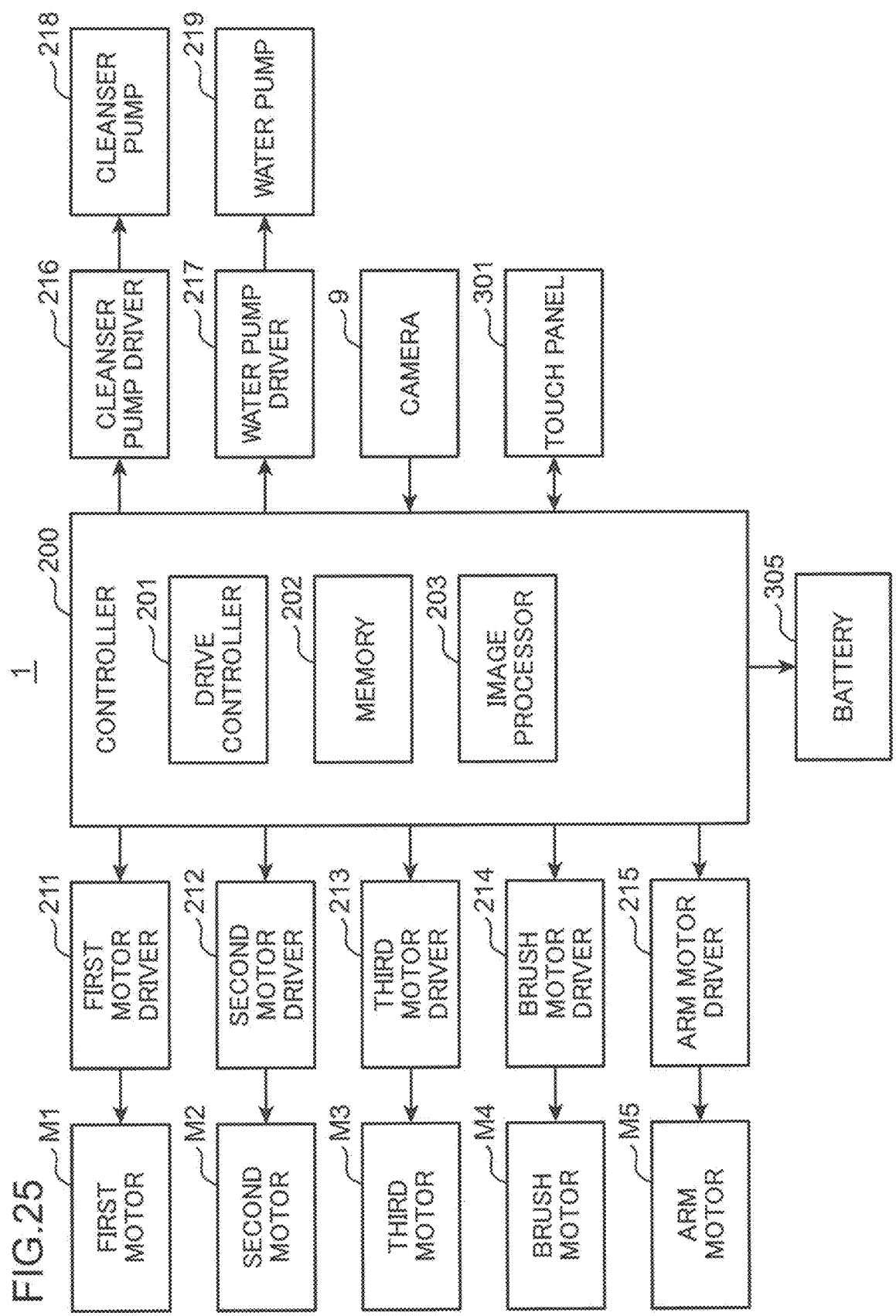
FIG. 25 is a block diagram of the cleaning robot according to the disclosure.

FIG. 25 is a block diagram of the cleaning robot 1 according to the disclosure. The cleaning robot 1 includes a first motor M1, a second motor M2, a third motor M3, the brush motor M4, the arm motor M5, a first motor driver 211, a second motor driver 212, a third motor driver 213, a brush motor driver 214, an arm motor driver 215, a cleanser pump driver 216, a water pump driver 217, a controller 200, the touch panel 301, a cleanser pump 218, a water pump 219, and a camera 9.

The first motor M1 is attached to the motor bracket 800 of the slide mechanism 80 constituting the Z slider 4. The first motor M1 slides the slide block 803 along Z direction to slide the arm 5 along Z direction. The first motor M1 rotates in a first rotational direction to slide the arm 5 toward the +Z direction and rotates in a second rotational direction to slide the arm 5 toward the −Z direction.

The second motor M2 is attached to the motor brackets 800 of each of the slide mechanisms 80 constituting a pair of the Y sliders 2. The second motor M2 slides the slide block 803 along Y direction to slide the arm 5 along Y direction. The second motor M2 rotates in a first rotational direction to slide the arm 5 toward the +Y direction and rotates in a second rotational direction to slide the arm 5 toward the −Y direction.

The third motor M3 is attached to the motor bracket 800 of the slide mechanism 80 constituting the X slider 3. The third motor M3 slides the slide block 803 along X direction to slide the arm 5 along X direction. The third motor M3 rotates in a first rotational direction to slide the arm 5 toward the +X direction and rotates in a second rotational direction to slide the arm 5 toward the −X direction.

The brush motor M4 is provided inside the second member 52 to rotate the brush 10 in a first rotational direction or a second rotational direction and vibrate the brush 10.

The arm motor M5 is provided inside the first member 54 to switch the orientation of the distal end portion 5A of the arm 5. In the embodiment, for example, the arm motor M5 switches the position of the arm 5 between a position in which the distal end portion 5A is oriented toward the +Z direction as illustrated in FIG. 16 and a position in which the distal end portion 5A is oriented toward the −Y direction illustrated in FIG. 17.

The first motor driver 211 includes a DC/AC inverter included in the DC/AC inverter unit 304 illustrated in FIG. 24. Controlled by the controller 200, the first motor driver 211 converts a DC power supplied from the battery 305 into an AC power and supplies the AC power to the first motor M1 to drive the first motor M1.

The second motor driver 212 includes a DC/AC inverter included in the DC/AC inverter unit 304 illustrated in FIG. 24. Controlled by the controller 200, the second motor driver 212 converts a DC power supplied from the battery 305 into an AC power and supplies the AC power to the second motor M2 to drive the second motor M2.

The third motor driver 213 includes a DC/AC inverter included in the DC/AC inverter unit 304 illustrated in FIG. 24. Controlled by the controller 200, the third motor driver 213 converts a DC power supplied from the battery 305 into an AC power and supplies the AC power to the third motor M3 to drive the third motor M3.

The brush motor driver 214 includes a DC/AC inverter included in the DC/AC inverter unit 304 illustrated in FIG. 24. Controlled by the controller 200, the brush motor driver 214 converts a DC power supplied from the battery 305 into an AC power and supplies the AC power to the brush motor M4 to drive the brush motor M4. The brush motor driver 214 and the brush motor M4 are examples of the brush driver.

The arm motor driver 215 includes a DC/AC inverter included in the DC/AC inverter unit 304 illustrated in FIG. 24. Controlled by the controller 200, the arm motor driver 215 converts a DC power supplied from the battery 305 into an AC power and supplies the AC power to the arm motor M5 to drive the arm motor M5.

The cleanser pump 218 includes a pump mechanism that pumps up the cleanser stored in the cleanser tank 306 and a pump motor that drives the pump mechanism. The cleanser pump 218, the cleanser tank 306, the cleanser supply line 62, and the nozzle 61 are examples of the cleanser discharger that discharges the cleanser from the front portion of the brush 10.

The water pump 219 includes a pump mechanism that pumps up the water stored in the water tank 303 and a pump motor that drives the pump mechanism. The water pump 219, the water tank 303, the water supply line 63, and the nozzle 61 are examples of the water discharger that discharges the water from the front portion of the brush 10.

The cleanser pump driver 216 includes a DC/AC inverter included in the DC/AC inverter unit 304 illustrated in FIG. 24. Controlled by the controller 200, the cleanser pump driver 216 converts a DC power supplied from the battery 305 into an AC power and supplies the AC power to the pump motor of the cleanser pump 218 to drive the cleanser pump 218.

The water pump driver 217 includes a DC/AC inverter included in the DC/AC inverter unit 304 illustrated in FIG. 24. Controlled by the controller 200, the water pump driver 217 converts a DC power supplied from the battery 305 into an AC power and supplies the AC power to the pump motor of the water pump 219 to drive the water pump 219.

Figure 28:
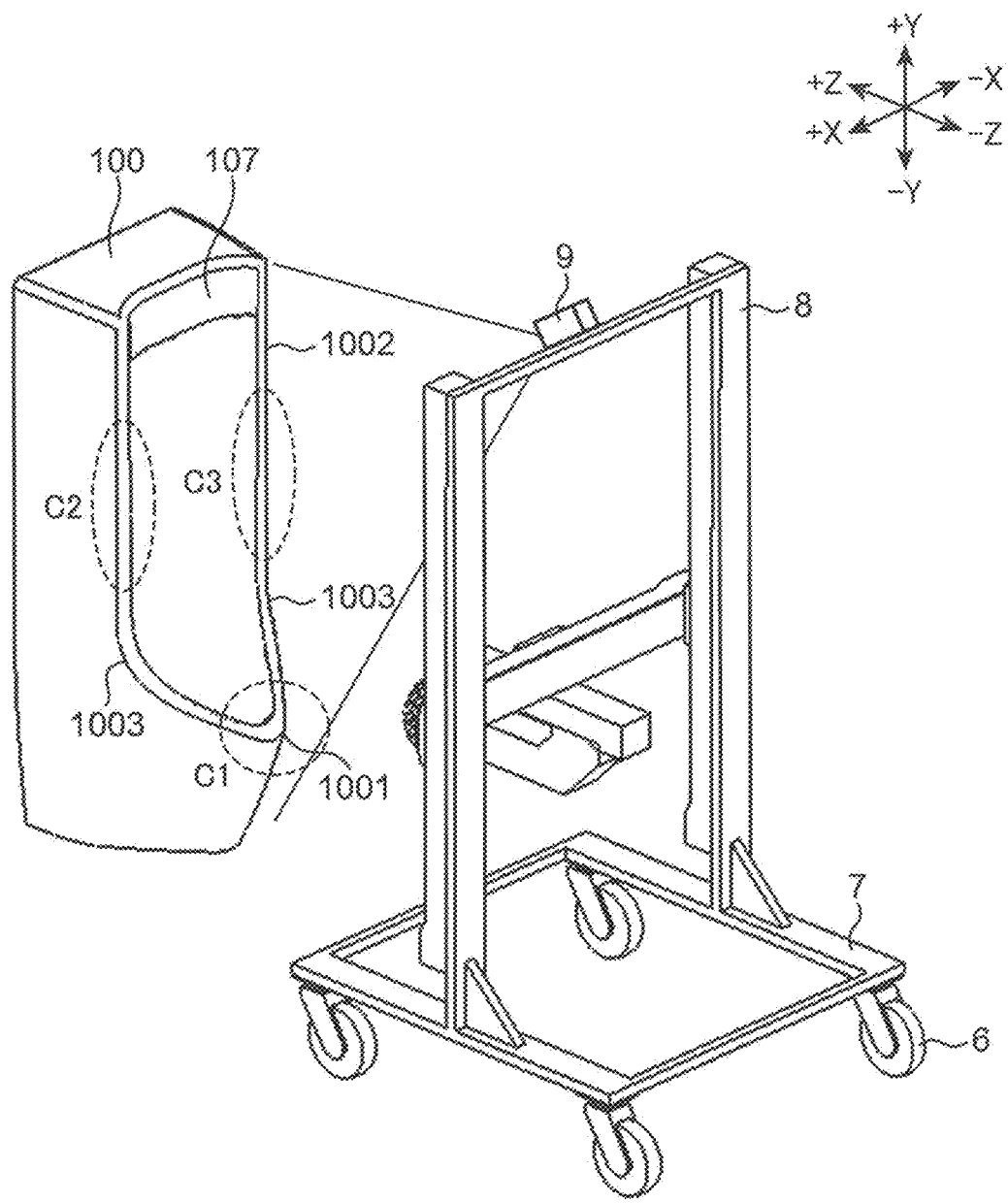
FIG. 28 illustrates a feature portion of a toilet.

The camera 9 is, for example, a depth camera that can capture an image including a depth component indicating the depth distribution of an object around the cleaning robot 1 and a luminance component indicating the luminance distribution of the object. The camera 9 is provided in the middle of the horizontal member constituting the vertical frame 8 and parallel to X direction as illustrated in FIG. 28. The viewing angle of the camera 9 is set diagonally downward to the front side.

The controller 200 is, for example, a microcomputer including a CPU and a non-volatile storing medium. The controller 200 includes a drive controller 201, a memory 202, and an image processor 203.

The drive controller 201 switches the orientation of the distal end portion 5A of the arm 5 between an orientation for cleaning the front face 101 of the toilet 100 and an orientation for cleaning the bottom face 102 of the toilet 100. Specifically, when cleaning the front face 101, the drive controller 201 outputs a control signal to the arm motor driver 215 to orient the distal end portion 5A to face the front face 101. When cleaning the bottom face 102, the drive controller 201 outputs a control signal to the arm motor driver 215 to orient the distal end portion 5A to face the bottom face 102.

The drive controller 201 outputs a control signal to each of the first motor driver 211, the second motor driver 212, and the third motor driver 213 to move the brush 10 according to route information included in cleaning sequence information stored in the memory 202. The drive controller 201 outputs a control signal to the arm motor driver 215 to switch the position of the arm 5 according to the cleaning sequence information stored in the memory 202. The drive controller 201 manages charging and discharging of the battery 305.

For example, when cleaning the front face 101, the drive controller 201 orients the distal end portion 5A of the arm 5 to face the front face 101 so that the front portion of the brush 10 faces the front face 101 of the toilet 100. When cleaning the bottom face 102, the drive controller 201 orients the distal end portion 5A of the arm 5 to face the bottom face 102 so that the front portion of the brush 10 faces the bottom face 102.

In more detail, when cleaning the front face 101, the drive controller 201 controls the arm 5 to take a position in which the second member 52 extends toward the +Z direction (first position). When cleaning the bottom face 102, the drive controller 201 controls the arm 5 to take a position in which the second member 52 extends toward the −Y direction (second position).

When cleaning the front face 101, the drive controller 201 fixes the orientation of the distal end portion 5A of the arm 5 toward the +Z direction. When cleaning the bottom face 102, the drive controller 201 fixes the orientation of the distal end portion 5A of the arm 5 toward the −Y direction. To switch the operation between cleaning of the front face 101 and cleaning of the bottom face 102, the drive controller 201 switches the orientation of the distal end portion 5A of the arm 5. Since the orientation of the arm 5 is kept fixed while cleaning the front face 101 or the bottom face 102, the brush 10 can contact the front face 101 and the bottom face 102 each with a suitable force.

The drive controller 201 outputs a control signal to the brush motor driver 214 to rotate the brush 10 about the longitudinal direction of the arm 5 as illustrated in FIG. 18.

The drive controller 201 outputs a control signal to the brush motor driver 214 to vibrate the brush 10 about the longitudinal direction of the arm 5 as illustrated in FIG. 19.

The memory 202 stores the cleaning sequence information. The cleaning sequence information includes the route information indicating the travel route of the brush 10, a command instructing the orientation of the arm 5, a command instructing the driving of the brush 10, a command instructing the moving velocity of the brush 10, a command for discharging water, and a command for discharging the cleanser.

The drive controller 201 can perform a cleanser applying process to apply the cleanser on the target face, and a rinsing process to rinse off the applied cleanser with water. When cleaning the front face 101, the rinsing process is not performed after finishing the cleanser applying process. In this case, the cleanser applied on the front face 101 can be rinsed off by the automated cleaning function of the toilet 100.

The route information is preset based on the shape of the toilet 100 to be cleaned and indicates the travel route of the brush 10. The command instructing the orientation of the arm 5 is, for example, a command to orient the distal end portion 5A of the arm 5 toward the +Z direction and a command to orient the distal end portion 5A of the arm 5 toward the −Y direction. The command instructing the driving of the brush 10 is, for example, a command to vibrate the brush 10, a command to rotate the brush 10 in the first rotational direction, and a command to rotate the brush 10 in the second rotational direction.

The image processor 203 derives a feature portion from an image of the toilet 100 captured by the camera 9 and calculates a shift of the machine coordinate system of the cleaning robot 1 from the toilet 100.

Figure 26:
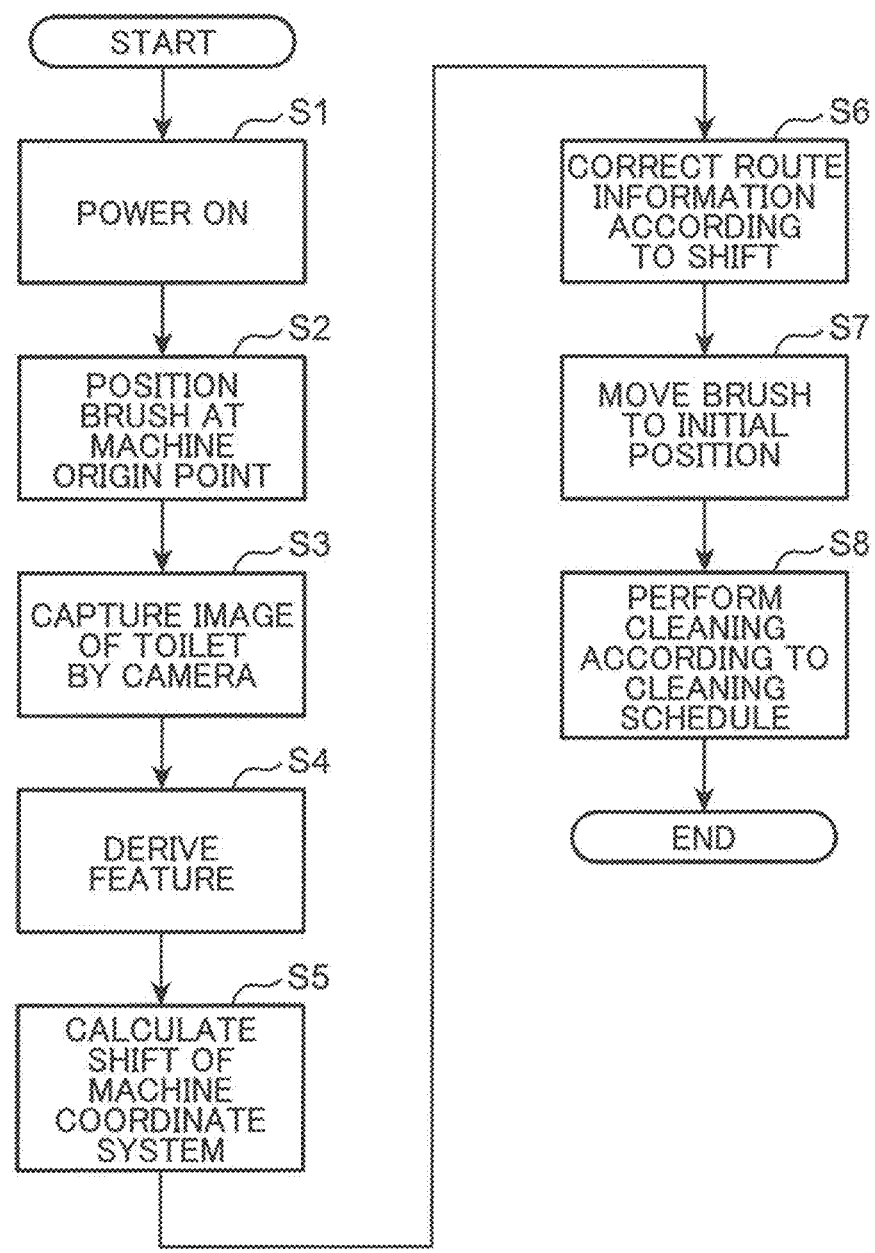
FIG. 26 is a flowchart illustrating an example process performed by the cleaning robot according to the embodiment of the disclosure.

FIG. 26 is a flowchart illustrating an example process performed by the cleaning robot 1 according to the embodiment of the disclosure. Before starting this flow, the user such as a cleaning person moves and places the cleaning robot 1 in front of the toilet 100 so that the cover 11 contains the toilet 100 and the cleaning robot 1 faces the front face 101 as illustrated in FIG. 23. The user turns on the power of the cleaning robot 1 (S1). A power is thereby supplied from the battery 305 to the components, such as the controller 200.

The drive controller 201 then outputs control signals to the first motor driver 211, the second motor driver 212, and the third motor driver 213 to position the brush 10 at a machine origin point (S2). The machine origin point is an origin point of a machine coordinate space preset in the cleaning robot 1. The machine coordinate space is defined by three axes of X direction, Y direction, and Z direction. For example, when the cleaning robot 1 faces the toilet 100 as illustrated in FIG. 28, the machine origin point is separated in the +Y direction side from a protruding portion 1001 of the toilet 100 (see FIG. 28). The protruding portion 1001 is provided on a rim 1002 of the inner face 105 of the toilet 100 to protrude farthermost toward the −Z direction.

The image processor 203 instructs the camera 9 to photograph the toilet 100 to obtain an image of the toilet 100 (S3). The image processor 203 derives a feature portion of the toilet 100. FIG. 28 illustrates a feature portion of the toilet 100. In the example in FIG. 28, three feature portions C1, C2, and C3 are derived. The feature portion C1 is an image of a region centered at the protruding portion 1001. The feature portion C2 is an image of a region centered at the middle of the rim 1002 in the +X direction side. The feature portion C3 is an image of a region centered at the middle of the rim 1002 in the −X direction side.

A feature of the disclosure is not limited to the three feature portions C1, C2, and C3 illustrated in FIG. 28. An image of a different region of the toilet 100 may be used as a feature portion. For example, the toilet 100 usually has a human detecting sensor provided in the center of an upper front face 107 provided above the front face 101. An image of a region including the human detecting sensor may be used as a feature portion. An image of a region including at a pair of curved portions 1003 below the rim 1002 may be used as a feature portion.

The image processor 203 calculates positional shifts between the feature portions C1, C2, and C3 and the feature portions C C2', and C3' previously stored in the memory 202, and calculates the three dimensional shift of the machine coordinate system from the toilet 100 (S5). The positions of the feature portions C1', C2', and C3' are positions in the machine coordinate system obtained from the predetermined shape data of the toilet 100. Thus, the three dimensional shift of the machine coordinate system from the toilet 100 can be calculated by calculating the shifts between the feature portions C1, C2, and C3 and the feature portions C1', C2', and C3'. For example, the three dimensional shift includes a shift of the machine coordinate system from an XZ plane, or a horizontal plane, and a shift of the machine coordinate system from a YZ plane, or a vertical plane.

The image processor 203 corrects the route information according to the three dimensional shift calculated in S5 (S6). The floor around the toilet 100 often has a step. When the cleaning robot 1 is set over the step, the cleaning robot 1 might tilt in a pitching direction against the toilet 100, and thus the XZ plane of the machine coordinate system might tilt against the horizontal plane. Moreover, the origin point of the machine coordinate system might be shifted from the assumed location in an actual space, which is a location above the protruding portion 1001, depending on the position of the cleaning robot 1 facing the toilet 100.

The route information is generated based on the shape data of the toilet 100, where the shape data is generated under an assumption that the XZ plane of the machine coordinate system is parallel to a horizontal plane and the YZ plane of the machine coordinate system is parallel to a vertical plane. When the brush 10 is positioned according to the route information under the presence of the three dimensional shift, the brush 10 might not be positioned at a desired position and the brush 10 might not move correctly with reference to the toilet 100. In the embodiment, the three dimensional shift of the machine coordinate system from the toilet 100 is calculated from the feature portions C1, C2, and C3, and the route information is corrected to eliminate the three dimensional shift.

The drive controller 201 outputs control signals to the first motor driver 211, the second motor driver 212, and the third motor driver 213 to move the brush 10 to the initial position defined by the corrected route information (S7).

The drive controller 201 moves the arm 5 in a sequence according to the cleaning sequence information to clean the toilet 100 (S8).

Figure 27:
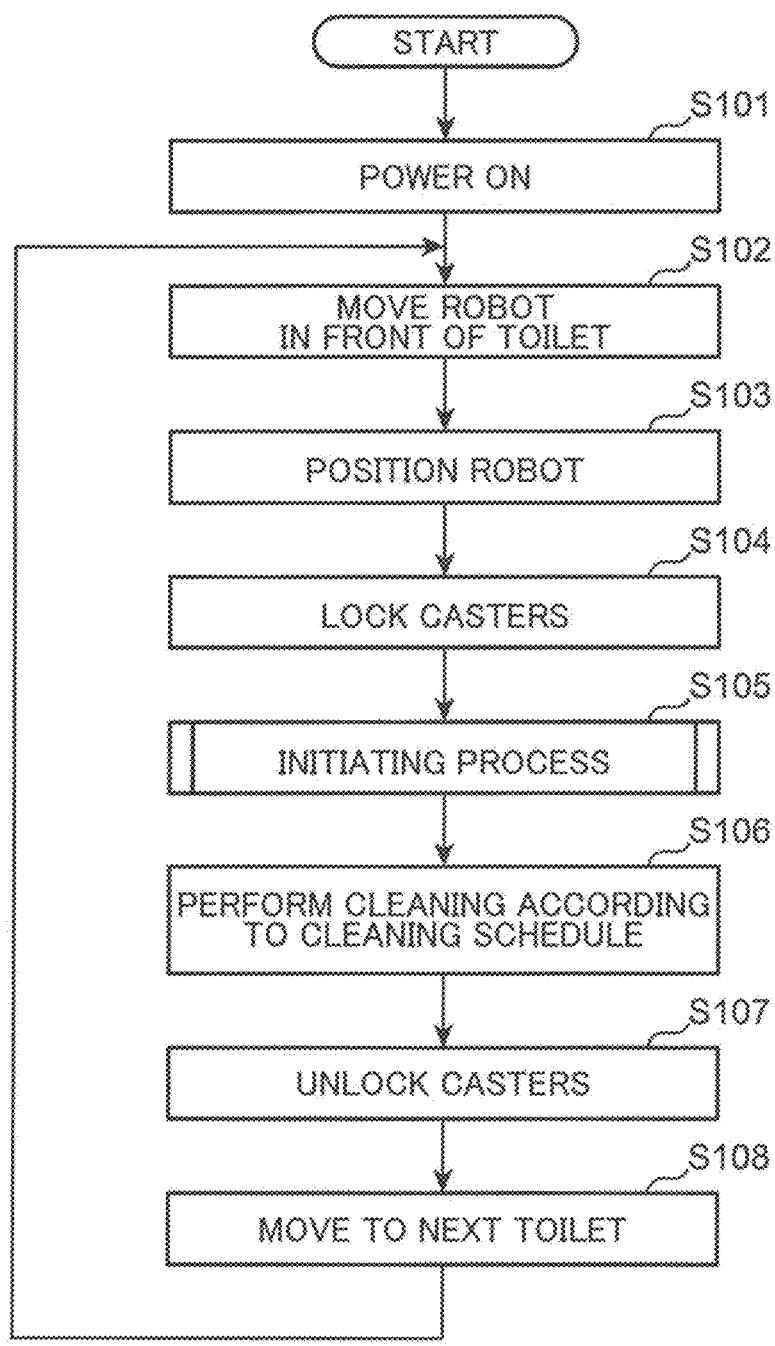
FIG. 27 is a flowchart illustrating another example process of the cleaning robot according to the embodiment of the disclosure.

FIG. 27 is a flowchart illustrating another example process of the cleaning robot 1 according to the embodiment of the disclosure. The flow includes an operation of the user. A process of S101 is the same as the process of S1. The cleaning robot 1 is moved and placed in front of the toilet 100 by the user (S102). As illustrated in FIG. 23, the cleaning robot 1 is positioned in front of the user so that the cover 11 contains the toilet 100 (S103).

The user locks the casters 6 of the cleaning robot 1 (S104). The cleaning robot 1 performs an initiating process (S105). In the initiating process of S105, processes of S2 to S7 illustrated in FIG. 26 are performed. For example, the initiating process may be started by a trigger given through the touch panel 301 by the user inputting a command to start cleaning. A process of S106 is the same as the process of S8 in FIG. 26. The user unlocks the casters 6 of the cleaning robot 1. The cleaning robot 1 is manually moved and placed in front of the next toilet 100 by the user (S108). After finishing the process of S108, the flow returns to S102.

The detail on a cleaning sequence of the cleaning robot 1 will be described. The cleaning sequence is performed by the drive controller 201 according to the cleaning sequence information stored in the memory 202. The cleaning sequence is the process of S8 in FIG. 26 and the process of S106 in FIG. 27.

FIG. 29 illustrates five processes sequentially performed in the cleaning sequence. FIG. 30 illustrates five processes sequentially performed after the cleaning sequence illustrated in FIG. 29. FIG. 31 illustrates five processes sequentially performed after the cleaning sequence illustrated in FIG. 30. FIG. 32 illustrates four processes sequentially performed after the cleaning sequence illustrated in FIG. 31. The cleaning sequence information is written with G-codes illustrated in FIGS. 33 to 43.

<Process P1>

As illustrated in FIG. 29, a process P1 is first performed in the cleaning sequence. In the process P1, an inner upper edge 109 is washed. The inner upper edge 109 is an inward-projecting face provided on the upper portion of the front face 101 of the toilet 100.

FIG. 33 illustrates a G-code of the process P1. The letters written in the left side of ":" in the G-code stand for a command. The sentence written in the right side of ":" explains the command. In the description below, symbols "." and "*" written at the beginning of each command are omitted.

The symbol "%" indicates the start of the G-code. A command "G90" defines an absolute coordinate system of the cleaning robot 1. For example, a three dimensional machine coordinate system including three axes of X direction, Y direction, and Z direction illustrated in FIG. 1 is defined.

A command "G94" sets a unit for feeding the brush 10, that is, a unit of the moving velocity of the brush 10. The unit of "mm/minute" is set. A command "G17" defines an XY plane as a work plane.

A command "G21" sets a unit of the coordinate system to indicate a travelling route of the brush 10 described below. The unit of millimeter is set. A command "T1 M6" selects a tool 1 to be used. This command is not applicable in the embodiment.

A command "M3" orients the distal end portion 5A of the arm 5 to face the front face 101 and the brush 10 along the horizontal direction. A command "G54" selects a work coordinate system. This command is not applicable in the embodiment. A cleanser-apply-ON command "M8" is executed. One second after executing the cleanser-apply-ON command "M8", a cleanser-apply-OFF command "M9" described later is executed to start applying of the cleanser.

A command "G1 F18000" sets the travelling pattern of the brush 10 to a linear movement and sets the moving velocity of the brush 10. A command "X Y Z" moves the brush 10 to an instructed coordinate position. The brush 10 is thereby moved to an initial position of the process P1. The symbols "" stand for a value indicating a coordinate position. When the route information is corrected in S6 in FIG. 26, the coordinate position "X Y Z**" is corrected according to the three dimensional shift amount of the machine coordinate system calculated in S5. Hereinafter, each of the coordinate positions is treated in the same manner.

A command "S1000" turns on the vibration of the brush 10. This command is in effect until OFF is given. A cleanser-apply-OFF command "M9" is executed. Applying of the cleanser is thereby performed.

A command "X Z" moves the brush 10 to an instructed coordinate position. The Y coordinate position is unchanged. The symbol "~" represents one or more commands of "X Z". The brush 10 is sequentially positioned at coordinate positions indicated by a plurality of commands of "X Z". When the brush 10 has moved to an instructed coordinate position with an instructed moving velocity, the brush 10 then moves toward the next coordinate position. The coordinate positions are flection points of the travelling route of the brush 10. The brush 10 moves linearly between the coordinate positions. For a curved travelling route, distances between the coordinate positions are determined considering the accuracy of linear interpolation of the curve.

The brush 10 moves along a path PT1 indicated by an arrow in FIG. 29. Specifically, the brush 10, keeping a constant height, enters the toilet 100 from the front side while moving to the right side, keeping contact with the lower face of the inner upper edge 109. When the brush 10 reaches the middle of the inner upper edge 109, the brush 10 retracts toward the rear side of the toilet 100 while moving to the right side.

A command "X Y Z" moves the brush 10 to an instructed coordinate position. The brush 10 slightly reduces its height at the right end of the inner upper edge 109. A command "X Z**" moves the brush 10 sequentially to instructed coordinate positions. The Y coordinate position is unchanged. The brush 10, keeping a constant height as illustrated in FIG. 29, enters the toilet 100 from the front side while moving to the left side. When reaching the middle of the inner upper edge 109, the brush 10 retracts toward the rear side of the toilet 100 while moving to the left side.

A command "S0" stops the vibration of the brush 10. A command "G17" defines an XY plane as a work plane. The process P1 is now finished.

<Process P2>

As illustrated in FIG. 29, a process P2 is executed after finishing the process P1. In the process P2, the cleanser is applied on the left side face 104. FIG. 34 illustrates a G-code of the process P2. Like in the process P1, commands "G90", "G94", "G17", "G21", "T1 M6", and "G54" are executed. In the process P2, the command "M3" in the process P1 is not executed, because the brush 10 is already oriented along the horizontal direction. A command "G54" selects a work coordinate system. This command is not applicable in the embodiment.

A command "G18" defines an XZ plane as a work plane. A command "G1 F18000" sets the travelling pattern of the brush 10 to a linear movement and also sets the moving velocity of the brush 10. Commands "X y Z**"~ move the brush 10 sequentially to instructed coordinate positions.

As illustrated in FIG. 29, the distal end portion 5A of the arm 5 is oriented to face the front face 101, the distance between the left side face 104 and the distal end of the brush 10 in a view looking the +X direction is kept at a predetermined distance, and the brush 10 is positioned, in a view looking the +Z direction, slightly to the inner side of the toilet 100 than the left side face 104 and near the upper portion of the left side face 104. The brush 10 moves toward the −Y direction. When reaching near the lower portion of the left side face 104 in a view looking the +Z direction, the brush 10 slightly moves toward the +Z direction and toward the +Y direction.

When the brush 10, facing the front face 101 of the toilet 100, enters the toilet 100 and applies the cleanser, the cleanser might not be applied on the whole area of the left side face 104. Regarding this problem, the embodiment keeps the distal end of the brush 10 separated from the left side face 104 by a predetermined distance in a view looking the +X direction when applying the cleanser. The cleanser is thus applied to the whole area of the left side face 104.

A command "G17" defines an XY plane as a work plane. A cleanser-apply-ON command "M8" is executed. Since applying of the cleanser in the process P1 is still continuing, applying of the cleanser is stopped by executing a cleanser-apply-OFF command "M9", which will be described later, one second after executing a cleanser-apply-ON command "M8". A command "G4 P0.001" is executed to give a one second pause. The cleanser-apply-OFF command "M9" stops applying of the cleanser. The cleanser-apply-ON command "M8" is given to set the cleaning robot 1 to be ready to apply the cleanser.

<Process P3>

As illustrated in FIG. 29, a process P3 is performed after finishing the process P2. In the process P3, the left side face 104 is washed by moving the brush 10 with the side portion of the brush 10 in contact with the left side face 104 and with applying of the cleanser stopped. FIG. 35 illustrates a G-code of the process P3. Like in the process P2, commands "G90", "G94", "G17", "G21", "T1 M6", "G54", "G18", and "G1 F18000" are executed. A command "X Y Z**" moves the brush 10 to an instructed coordinate position. The brush 10 is thereby moved to an initial position of the process P3.

A command "S1000" turns on the vibration of the brush 10. Commands "X Y Z**"~ move the brush 10 sequentially to instructed coordinate positions. As illustrated in FIG. 29, the brush 10 moves all over the left side face 104 along the path PT3 indicated by an arrow with the side portion of the brush 10 in contact with the left side face 104. During this movement, the brush 10 vibrates and applying of the cleanser is stopped. Specifically, after moving from the upper side to the lower side of the left side face 104, the brush 10 moves slightly toward the +Z direction and then moves from the lower side to the upper side of the left side face 104.

A command "G17" defines an XY plane as a work plane.
<Process P4>

As illustrated in FIG. 29, a process P4 is performed after finishing the process P3. In the process P4, a left step 101a provided between the front face 101 and the left side face 104 is washed. FIG. 36 illustrates a G-code of the process P4. Like in the process P3, commands "G90", "G94", "G17", "G21", "T1 M6", "G54", "G18", and "G1 F18000" are executed.

A cleanser-apply-OFF command "M9" performs applying of the cleanser. The cleanser-apply-OFF command "M9" is used in combination with the cleanser-apply-ON command "M8", which is the last command in the process P2. Since applying of the cleanser is stopped, giving the cleanser-apply-OFF command "M9" performs applying of the cleanser. Commands "X Y Z**"~ move the brush 10 sequentially to instructed coordinate positions.

As illustrated in FIG. 29, the brush 10 moves all over the left step 101a along a path PT4 indicated by an arrow with the front portion of the brush 10 in contact with the left step 101a. During this movement, the brush 10 vibrates and the cleanser is applied. Specifically, after moving from the upper side to the lower side along the left side of the left step 101a, the brush 10 moves slightly inward in the toilet 100 and then moves from the lower side to the upper side along the right side of the left step 101a.

A cleanser-apply-ON command "M8" is executed. One second after executing the cleanser-apply-ON command "M8", a cleanser-apply-OFF command "M9" described later is executed to stop applying of the cleanser.

A command "G4 P0.001" is executed to give a one second pause. The cleanser-apply-OFF command "M9" stops applying of the cleanser. The cleanser-apply-ON command "M8" is given to set the cleaning robot 1 to be ready to apply the cleanser.

Commands "X Y Z**"~ move the brush 10 sequentially to instructed coordinate positions. As illustrated in FIG. 29, the brush 10 moves along the path PT4 indicated by the arrow with the side portion of the brush 10 in contact with the left step 101a. During this movement, the brush 10 vibrates and applying of the cleanser is stopped.

A cleanser-apply-OFF command "M9" performs applying of the cleanser. Commands "X Y Z**"~ move the brush 10 sequentially to instructed coordinate positions. As illustrated in FIG. 29, the brush 10 moves along the path PT4 indicated by the arrow with the side portion of the brush 10 in contact with the left step 101a. During this movement, the brush 10 vibrates and the cleanser is applied.

Commands "M8", "G4 P0.001", and "M9" stop applying of the cleanser.
<Process P5>

As illustrated in FIG. 29, a process P5 is executed after finishing the process P4. In the process P5, the cleanser is applied on the left front face. The left front face is the left half region of the front face 101. FIG. 37 illustrates a G-code of the process P5. A cleanser-apply-ON command "M8" is given to set the cleaning robot 1 to be ready to apply the cleanser. Commands "X Y Z**"~ move the brush 10 sequentially to instructed coordinate positions.

As illustrated in FIG. 29, the brush 10 moves all over the left front face along a path PT5 indicated by an arrow with the front portion of the brush 10 in contact with the left front face of the toilet 100. During this movement, the brush 10 vibrates and applying of the cleanser is stopped. Specifically, the brush 10 moves from a left upper position to a right upper position along the left front face by a movement similar to raster scanning with the main scanning direction along Y direction and the sub scanning direction along X direction.

A cleanser-apply-OFF command "M9" performs applying of the cleanser. Commands "X Y Z**"~ move the brush 10 sequentially to instructed coordinate positions. As illustrated in FIG. 29, the brush 10 moves all over the left front face along the path PT5 with the front portion of the brush 10 in contact with the left front face of the toilet 100. During this movement, the brush 10 vibrates and the cleanser is applied.

A cleanser-apply-ON command "M8" is executed. One second after executing the cleanser-apply-ON command "M8", a cleanser-apply-OFF command "M9" described later is executed to stop applying of the cleanser.

A command "G4 P0.001" is executed to give a one second pause. The cleanser-apply-OFF command "M9" stops applying of the cleanser. This command is used in combination with the cleanser-apply-ON command "M8" given one second earlier.

A cleanser-apply-ON command "M8" is executed. Commands "X Y Z**"~ move the brush 10 sequentially to instructed coordinate positions. As illustrated in FIG. 29, the brush 10 moves all over the left front face along the path PT5 with the front portion of the brush 10 in contact with the left front face of the toilet 100. During this movement, the brush 10 vibrates and applying of the cleanser is stopped.

A command "G17" defines an XY plane as a work plane. A command "S0" stops the vibration of the brush 10.
<Process P6>

As illustrated in FIG. 30, a process P6 is performed after finishing the process P5. In the process P6, the cleanser is applied on the right side face 103. Description on the process P6 is omitted, because the process P6 is the same as the process P2 except that the target face is the right side face 103.
<Process P7>

As illustrated in FIG. 30, a process P7 is performed after finishing the process P6. In the process P7, the right side face 103 is washed. Description on the process P7 is omitted, because the process P7 is the same as the process P3 except that the target face is the right side face 103.
<Process P8>

As illustrated in FIG. 30, a process P8 is performed after finishing the process P7. In the process P8, a right step 101b is washed. Description on the process P8 is omitted, because the process P8 is the same as the process P4 except that the target face is the right step 101b.
<Process P9>

As illustrated in FIG. 30, a process P9 is performed after finishing the process P8. In the process P9, the cleanser is applied on the right front face, which is the right half region of the front face of the toilet 100. Description on the process P9 is omitted, because the process P9 is the same as the process P5 except that the target face is the right front face.
<Process P10 and Process P11>

As illustrated in FIG. 30, a process P10 is performed after finishing the process P9. In the process P10, the distal end portion 5A of the arm 5 is oriented toward the −Y direction, thereby orienting the brush 10 downward.

As illustrated in FIG. 31, a process P11 is performed after finishing the process P10. In the process P11, the bottom face 102 is washed. FIGS. 38 and 39 illustrate G-codes of the processes P10 and P11.

Like in the process P1, commands "G90", "G94", "G17", "G21", "T1 M6", and "G54" are executed. A command "G1 F18000" sets the travelling pattern of the brush 10 to a linear movement and also sets the moving velocity of the brush 10.

A command "M4" orients the brush 10 downward. A command "X Y Z*"" moves the brush 10 to an instructed coordinate position. The brush 10 is thereby moved to an initial position of the process P11.

A cleanser-apply-OFF command "M9" is executed. Applying of the cleanser is thereby performed. Commands "G2 X Z I K"~, "G3 X Z I K", and "G1 X Y Z**"~ move the brush 10 sequentially to instructed positions. During this movement, the brush 10 vibrates and the cleanser is applied.

Commands "M8", "G4 P0.001", and "M9" stop applying of the cleanser. The command "M8" sets the cleaning robot 1 to be ready to apply the cleanser. Commands "G1 X Y Z*"~ sequentially move the brush 10. During this movement, the brush 10 vibrates and applying of the cleanser is stopped. Subsequently, the G-code in FIG. 39 is executed.

A command "M9" performs applying of the cleanser. Commands "X Y Z**"~ sequentially move the brush 10 to instructed positions. During this movement, the brush 10 vibrates and the cleanser is applied. Commands "M8", "G4 P0.001", and "M9" stop applying of the cleanser.

The command "M8" sets the cleaning robot 1 to be ready to apply the cleanser. Commands "G1 X Y Z"~ sequentially move the brush 10 to instructed positions. During this movement, the brush 10 vibrates and applying of the cleanser is stopped. A command "M9" performs applying of the cleanser. Commands "G1 X Y Z"~ sequentially move the brush 10 to instructed positions. During this movement, the brush 10 vibrates and the cleanser is applied.

Commands "M8", "G4 P0.001", and "M9" stop applying of the cleanser. The command "M8" sets the cleaning robot 1 to be ready to apply the cleanser. Commands "G1 X Y Z**"~ sequentially move the brush 10 to instructed positions. During this movement, the brush 10 vibrates and applying of the cleanser is stopped.

A command "M9" performs applying of the cleanser. Commands "X Y Z**"~ sequentially move the brush 10 to instructed positions. During this movement, the brush 10 vibrates and the cleanser is applied.

Commands "M8", "G4 P0.001", and "M9" stop applying of the cleanser. A command "G1 Y" moves the brush 10 to an instructed coordinate position by changing only the Y coordinate position. A command "X Y** Z*"" moves the brush 10 to an instructed position.

Now, see FIG. 31. In the process P11, the brush 10 moves around a trap 110 along arc paths of different radiuses as indicated by a path PT11. Along with this movement, applying of the cleanser is alternately performed and stopped to wash the whole area of the bottom face 102.

<Process P12>

As illustrated in FIG. 31, a process P12 is performed after finishing the process P11. In the process P12, the trap 110 provided approximately in the center of the bottom face 102 is washed. FIG. 40 illustrates a G-code of the process P12. Commands "G90", "G94", "G17", "G21", "T1 M6", "G54", "G18", and "G1 F18000" are executed to determine settings. Commands "X Y Z**"~ sequentially move the brush 10 to coordinate positions. As illustrated in FIG. 31, the brush 10 moves around the circular trap 110 along concentric circles as indicated by a path PT12. During this movement, the brush 10 vibrates and applying of the cleanser is stopped. Finally, a command "G17" is executed, and the process P12 is finished.

<Process P13, Process P14, and Process P15>

As illustrated in FIG. 31, a process P13, a process P14, and a process P15 are sequentially performed after finishing the process P12. In the process P13, a left bottom step 102a is washed. The left bottom step 102a continues from the left step 101a and forms a boundary between the left side face 104 and the bottom face 102. In the process P14, the brush 10 moves back and forth along the left bottom step 102a as indicated by a path PT13. During this movement, the brush 10 vibrates and applying of the cleanser is stopped.

In the process P14, a back side of bottom protrusion is washed. The back side of bottom protrusion is the back side of a portion rising from the distal end of the bottom face 102 to the protruding portion 1001. In the process P14, the brush 10 linearly moves back and forth along the back side of bottom protrusion as indicated by a path PT14. During this movement, the brush 10 vibrates and applying of the cleanser is stopped.

In the process P15, a right bottom step 102b is washed. The right bottom step 102b continues from the right step 101b and forms a boundary between the right side face 103 and the bottom face 102. In the process P15, the brush 10 moves back and forth along the right bottom step 102b as indicated by a path PT15. During this movement, the brush 10 vibrates and applying of the cleanser is stopped.

FIG. 41 illustrates a G-code of the process P13, the process P14, and the process P15. Commands "G90", "G94", "G17", "G21", "T1 M6", "G54", "G18", and "G1 F18000" are sequentially executed to determine settings. A command "X Y Z*"" moves the brush 10 to an instructed coordinate position. The brush 10 is thereby moved to an initial position of the process P13.

A command "S1000" vibrates the brush 10. Commands "X Y Z**"~ sequentially move the brush 10 to instructed coordinate positions. The brush 10 thereby moves along the path PT13, the path PT14, and the path PT15 in FIG. 31.

A command "G17" defines an XY plane as a work plane. A command "S0" stops the vibration of the brush 10.

<Process P16>

As illustrated in FIG. 32, a process P16 is performed after finishing the process P15. In the process P16, the right side face 103 is rinsed. In the process P16, the brush 10 moves along the same travelling route as in the process P2. In the process P16, water is applied instead of the cleanser. The cleanser applied on the right side face 103 in the process P2 is thereby rinsed off.

FIG. 42 illustrates a G-code of the process P16. Commands "G90", "G94", "G17", "G21", "T1 M6", "G54", "G18", and "G1 F18000" are sequentially executed to determine settings. A command "M3" orients the brush 10 along the horizontal direction. A command "X Y Z**" moves the brush 10 to an instructed coordinate position. The brush 10 is thereby moved to an initial position of the process P16.

A command "M7" starts discharge of water from the brush 10. Commands "X Y Z**"~ sequentially move the brush 10 to instructed positions with water discharged from the brush 10. A command "M9" stops the discharge of water. A command "M17" is executed, and the process P16 is finished.

<Process P17>

As illustrated in FIG. 32, a process P17 is performed after finishing the process P16. In the process P17, the left side face 104 is rinsed. In the process P17, the brush 10 moves along the same travelling route as in the process P6. Detailed description on the process P17 is omitted, because the process P17 is the same as the process P16 except that the target object is the left side face 104.

<Process P18>

As illustrated in FIG. 32, a process P18 is performed after finishing the process P17. In the process P18, the bottom face 102 is rinsed. FIG. 43 illustrates a G-code of the process P18. Commands "G90", "G94", "G17", "G21", "T1 M6", "G54", "G18", and "G1 F18000" are sequentially executed to determine settings.

A command "M4" orients the brush 10 downward. A command "X Y Z" moves the brush 10 to an instructed coordinate position. The brush 10 is thereby moved to an initial position of the process P18. A command "M7" starts discharge of water from the brush 10. Commands "X Y Z"~ sequentially move the brush 10 to instructed positions with water discharged from the brush 10. As illustrated in FIG. 32, the brush 10 moves so as the water is discharged along a path PT18. Specifically, the brush 10 of which distal end is separated from the toilet 100 in a Y directional view discharges the water along the forward rim of the bottom face 102. The cleanser applied in the process P12 is thereby rinsed off. A command "G17" is executed, and the process P18 is finished. Subsequently, an initiating process is performed. A command "G0 X0.0 Z0.0" returns the brush 10 to the origin point. A command "M3" orients the brush 10 along the horizontal direction. Commands "M30" and "%" are executed, and the processes instructed by the G-codes are finished.

<Process P19>

As illustrated in FIG. 32, a process P19 is performed after finishing the process P18. In the process P19, the front face 101 is rinsed. In this process, an automated cleaning function equipped in the toilet 100 is used. The toilet 100 has a human detecting sensor and a function of automatically letting water flow when detecting a person walking away from the toilet 100. The process P19 uses this function. Thus, the cleaning robot 1 performs no particular process. When the human detecting sensor of the toilet 100 detects that the cleaning robot 1 has been moved by the user, the water flows. The cleanser applied on the front face 101 in the process P5 and the process P9 is thereby rinsed off. Instead of using the automated cleaning function of the toilet 100 in the process P19, the cleaning robot 1 may discharge water from the distal end of the brush 10 toward the front face 101 to rinse the front face 101.

As described above, the cleaning robot 1 according to the embodiment includes the arm 5 movable in X direction, Y direction, and Z direction perpendicular to each other, and the brush 10 attached to the distal end portion 5A of the arm 5, so that the brush 10 can be moved in any direction along the target face of the toilet 100.

The orientation of the distal end portion 5A of the arm 5 is switched between the orientation for cleaning the front face 101 and the orientation for cleaning the bottom face 102. The distal end portion 5A is oriented toward the +Z direction when cleaning the front face 101, and toward the −Y direction when cleaning the bottom face 102. In such a manner, the brush 10 can contact the front face 101 and the bottom face 102 each with a suitable force. Accordingly, a stain on the toilet 100 having a plurality of target faces facing different directions can sufficiently be cleaned off using the cleaning robot 1.

The settings determined by the G-codes, such as the moving velocity, are just examples. The disclosure is not limited to such examples.

The disclosure includes an exemplary embodiment described below.

(1) The cleaning robot 1 may orient the distal end portion 5A of the brush 10 toward the −Y direction to clean a Western style toilet.

(2) In the example in FIG. 14, the brush 10 is rotatable about the longitudinal direction of the arm 5. Other than this example, the brush 10 may vibrate along the longitudinal direction. In such a case, a motor that vibrates the brush 10 along the longitudinal direction of the second member 52 at a predetermined vibrational amplitude may be provided inside the second member 52.

(3) In the embodiment described above, the cleaning robot 1 is moved on the ground by a force given by a user. The disclosure is not limited to such a configuration. The cleaning robot 1 may move autonomously. In such a case, the cleaning robot 1 may move to a targeted toilet 100 while estimating its own location on a map data in which the location of the toilet 100 is shown. The estimation may be made using a self-localization technique, such as a SLAM.

(4) In the embodiment described above, the cleaning robot 1 is configured to orient the distal end portion 5A of the arm 5 toward the +Z direction and the −Y direction. The disclosure is not limited to such a configuration. For example, the cleaning robot 1 may switch the orientation of the distal end portion 5A of the arm 5 toward any direction. For example, when the target face is inclined against a horizontal plane by 45 degrees, the distal end portion 5A of the arm 5 can be oriented toward a direction tilted against the +Z direction by 45 degrees so that the brush 10 faces the target face.

(5) A plurality of different types of brushes 10 may arbitrarily be attached to the arm 5. This allows the cleaning robot 1 to select, for example, a suitable type of the brush 10 to be used depending on a type of the toilet 100 or a type of the target face.

(6) In the example G-codes described above, the brush 10 is vibrated. The motion of the brush 10 may be switched between rotation and vibration according to the target face. For example, the brush 10 may be rotated when cleaning the right side face 103 and the left side face 104 as illustrated in FIG. 18. The brush 10 may be rotated when cleaning the front face 101. The motion of the brush 10 may arbitrarily be switched between vibration and rotation according to a degree of the stain. The motion of the brush 10 may be switched between vibration and rotation according to the cleaning schedule. For example, the brush 10 may be rotated for a daily cleaning, and vibrated for thorough cleaning done every couple of months. Switching between rotation and vibration of the brush 10 may be done, for example, by a user manipulating through the touch panel 301. Since cleaning with the rotating brush 10 tends to take a shorter time than cleaning with the vibrating brush 10, a daily cleaning can be finished within a short time by switching the motion of the brush 10 to a rotation. The rotating brush 10 manifests a higher stain cleaning-off performance than the vibrating brush 10. Thus, a stain can further surely be cleaned off by switching the motion of the brush 10 to a vibration for through cleaning. Spattering of liquid is further suppressed when the brush 10 is vibrated than when the brush 10 is rotated.

This application is based on Japanese Patent application No. 2019-036419 filed in Japan Patent Office on Feb. 28, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A cleaning robot for cleaning an object, the cleaning robot comprising:
    an arm including a distal end portion to which a brush is attached, the arm extending in a first direction parallel to a horizontal direction;
    a driver connected to the arm,
    the driver including a first mechanism that moves the arm in the first direction, a second mechanism that moves the arm in a second direction parallel to a vertical direction perpendicular to the first direction, and a third mechanism that moves the arm in a third direction perpendicular to both the first direction and the second direction,
    the arm being configured to switch an orientation of the distal end portion; and
    a controller configured to switch the orientation of the distal end portion between an orientation for cleaning a first target face of the object and an orientation for cleaning a second target face of the object, the first target face facing the first direction, the second target face facing the second direction.

2. The cleaning robot according to claim 1, wherein
    the arm includes a joint, and
    the controller orients the distal end portion to face the first target face when cleaning the first target face and orients the distal end to face the second target face when cleaning the second target face.

3. The cleaning robot according to claim 2, wherein
    the arm includes a first member extending in the first direction and a second member pivotally attached to the first member via the joint and including the distal end portion, and
    the joint is switchable between a first position in which the second member extends in the first direction and a second position in which the second member extends in the second direction.

4. The cleaning robot according to claim 3, wherein a nozzle for discharging liquid is positioned in the second member and a distal end portion of the nozzle extends from the second member into the brush.

5. The cleaning robot according to claim 4, wherein the brush includes a brush body and a plurality of raised portions radially extending from the brush body, and the distal end portion of the nozzle projects out from the brush body in an extension direction of the second member.

6. The cleaning robot according to claim 1, further comprising a brush driver configured to rotate the brush about a longitudinal direction of the arm.

7. The cleaning robot according to claim 6, wherein
    the brush driver alternately switch a rotational direction of the brush to vibrate the brush.

8. The cleaning robot according to claim 1, wherein
    the controller fixes the orientation of the distal end portion toward the first direction when cleaning the first target face.

9. The cleaning robot according to claim 1, wherein
    the controller fixes the orientation of the distal end portion toward the second direction when cleaning the second target face.

10. The cleaning robot according to claim 1, wherein
    the controller switches the orientation of the distal end portion when an operation is switched between cleaning of the first target face and cleaning of the second target face.

11. The cleaning robot according to claim 1, further comprising:
    a cleanser discharger configured to discharge a cleanser from a front portion of the brush; and
    a water discharger configured to discharge water from the front portion of the brush, wherein
    the controller is capable of performing a cleanser applying process to apply the cleanser on the object by controlling the cleanser discharger, and a rinsing process to wash off the cleanser applied on the object with the water by controlling the water discharger, and
    when cleaning the first target face, the rinsing process is not performed after performing the cleanser applying process.

12. The cleaning robot according to claim 1, further comprising a cleanser discharger configured to discharge a cleanser from a front portion of the brush, wherein
    when cleaning a third target face facing the third direction, the controller orients the distal end portion toward the first direction and keeps a predetermined distance between the third target face and the brush in a view looking the third direction while causing the cleanser discharger to apply the cleanser.

13. The cleaning robot according to claim 1, wherein
    the controller drives the driver to move the brush according to route information of the brush, the route information being predetermined based on a shape of the object.

14. The cleaning robot according to claim 13, further comprising camera configured to capture an image of the object, wherein
    the controller derives a predetermined feature portion of the object from an image captured by the camera, compares a location of the feature portion derived with a predetermined location of the feature determined under a condition where a coordinate system of the cleaning robot is not shifted from the object, calculates a shift of the coordinate system from the object by the comparison, and corrects the route information based on the shift.

15. The cleaning robot according to claim 1, wherein
    the object is a urinal for males.

16. The cleaning robot according to claim 1, wherein the arm includes a nozzle connected to a supply line and configured to discharge liquid.

17. The cleaning robot according to claim 16, wherein a distal end portion of the nozzle extends through the distal end portion of the arm and into the brush.

18. The cleaning robot according to claim 17, wherein the brush includes a brush body and a plurality of raised portions radially extending from the brush body, and the distal end portion of the nozzle projects out from the brush body in an extension direction of the arm.

19. The cleaning robot according to claim 1, wherein the arm includes a nozzle connected to a cleanser supply line and a water supply line, and wherein the nozzle is configured to discharge a cleanser or water.

* * * * *